United States Patent
Lee et al.

(10) Patent No.: US 11,602,850 B2
(45) Date of Patent: Mar. 14, 2023

(54) METHOD FOR IDENTIFYING MOVING OBJECT IN THREE-DIMENSIONAL SPACE AND ROBOT FOR IMPLEMENTING SAME

(71) Applicant: LG ELECTRONICS INC., Seoul (KR)

(72) Inventors: Changhyeon Lee, Seoul (KR); Byungkon Sohn, Seoul (KR); Kyuchun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 482 days.

(21) Appl. No.: 16/622,183

(22) PCT Filed: May 18, 2018

(86) PCT No.: PCT/KR2018/005747
§ 371 (c)(1),
(2) Date: Dec. 12, 2019

(87) PCT Pub. No.: WO2018/230852
PCT Pub. Date: Dec. 20, 2018

(65) Prior Publication Data
US 2020/0114509 A1    Apr. 16, 2020

(30) Foreign Application Priority Data
Jun. 15, 2017  (KR) .................. 10-2017-0076120

(51) Int. Cl.
*B25J 9/16* (2006.01)
*G01S 17/86* (2020.01)
(Continued)

(52) U.S. Cl.
CPC ........... *B25J 9/1666* (2013.01); *B25J 9/1697* (2013.01); *G01S 17/86* (2020.01); *G01S 17/89* (2013.01);
(Continued)

(58) Field of Classification Search
CPC ....... B25J 9/1666; B25J 9/1697; G01S 17/86; G01S 17/89; G01S 7/4808; G01S 17/42;
(Continued)

(56) References Cited

U.S. PATENT DOCUMENTS

| 2004/0001019 A1* | 1/2004 | Nakazawa | G01S 13/87 342/70 |
| 2010/0161225 A1* | 6/2010 | Hyung | G05D 1/0274 345/420 |

(Continued)

FOREIGN PATENT DOCUMENTS

| CA | 2824606 A1 * | 7/2012 | ............... B25J 19/02 |
| CA | 2928262 A1 * | 7/2012 | ............ B25J 11/009 |

(Continued)

OTHER PUBLICATIONS

JP2012089174A (disclosed in IDS) Translation—Year: 2012.*

*Primary Examiner* — Abby Y Lin
*Assistant Examiner* — Dylan Brandon Mooney
(74) *Attorney, Agent, or Firm* — Birch, Stewart, Kolasch & Birch, LLP

(57) ABSTRACT

A method for identifying a moving object in a three-dimensional space and a robot for implementing same is provided. The robot includes a sensing module for calculating height and position information of an object by using two or more sensing units; a movement unit for moving the robot; a map storage unit for storing a three-dimensional map including the height and position information of the object, calculated by the sensing module, in a space in which the robot is moving; and a control unit for controlling the sensing module, the movement unit, and the map storage unit, converting the height and position information of the object calculated by the sensing module into global coordinates, storing, in the three-dimensional map, the height and position information of the object converted into the global (Continued)

coordinates, and removing, from the three-dimensional map, a moving object among objects stored in the map storage unit.

19 Claims, 17 Drawing Sheets

(51) Int. Cl.
 *G01S 17/89* (2020.01)
 *G05D 1/02* (2020.01)
(52) U.S. Cl.
 CPC ......... *G05D 1/0238* (2013.01); *G05D 1/0255* (2013.01)
(58) Field of Classification Search
 CPC ........ G01S 13/88; G01S 13/93; G01S 15/931; G01S 17/931; G01S 13/881; G05D 1/0238; G05D 1/0255; G05D 2201/0211; G05D 1/0274; G05D 1/024; G05D 1/0257; G06T 7/50; G06T 7/70
 See application file for complete search history.

(56) References Cited

U.S. PATENT DOCUMENTS

| | | | | |
|---|---|---|---|---|
| 2015/0012164 | A1* | 1/2015 | Yu | G05D 1/0274 |
| | | | | 701/23 |
| 2015/0175178 | A1* | 6/2015 | Ignatius | B61L 23/041 |
| | | | | 246/120 |
| 2018/0210448 | A1* | 7/2018 | Lee | G05D 1/0291 |
| 2018/0211103 | A1* | 7/2018 | Sohn | G05D 1/024 |

FOREIGN PATENT DOCUMENTS

| | | | | |
|---|---|---|---|---|
| JP | 2005-310043 | A | 11/2005 | |
| JP | 2012-89174 | A | 5/2012 | |
| JP | 2014-157478 | A | 8/2014 | |
| JP | 2014-203429 | A | 10/2014 | |
| JP | 2015-92348 | A | 5/2015 | |
| KR | 10-2017-0061373 | A | 6/2017 | |
| KR | 20180061949 | A * | 6/2018 | ............ B25J 9/1676 |

* cited by examiner

FIG. 7

| | 0 | 1 | 2 | 3 | 4 | 5 | 6 | 7 | 8 | 9 |
|---|---|---|---|---|---|---|---|---|---|---|
| 9 | 1000 | 1010 | 1000 | <u>1500</u> | 2000 | 2000 | 2000 | 2000 | 2000 | 1050 |
| 8 | | | | | | | | | | 1500 |
| 7 | | <u>100</u> | | | | | | | | 1500 |
| 6 | | | | 1510 | | | | | | 1500 |
| 5 | | | | 1500 | <u>420</u> | <u>420</u> | | | | <u>700</u> |
| 4 | | | | 1500 | | | | | | <u>700</u> |
| 3 | <u>890</u> | | | | | | | | | |
| 2 | <u>890</u> | | | | | | | | | |
| 1 | <u>890</u> | | | | | | | | | <u>600</u> |
| 0 | | | | | | | | | | <u>600</u> |

FIG. 8

|   | 0 | 1 | 2 | 3 | 4 | 5 | 6 | 7 | 8 | 9 |
|---|---|---|---|---|---|---|---|---|---|---|
| 9 | (1000, 0) | (1010, 0) | (1000, 0) | (1500, 1200) | (2000, 500) | (2000, 500) | (2000, 500) | (2000, 500) | (2000, 500) | (1050, 300) |
| 8 |   |   |   |   |   |   |   |   |   | (1500, 200) |
| 7 |   | (100, 0) |   |   |   |   |   |   |   | (1500, 200) |
| 6 |   |   |   | (1510, 0) |   |   |   |   |   | (1500, 200) |
| 5 |   |   |   | (1500, 0) | (420, 0) | (420, 0) |   |   |   | (700, 150) |
| 4 |   |   |   | (1500, 0) |   |   |   |   |   | (700, 150) |
| 3 | (890, 800) |   |   |   |   |   |   |   |   |   |
| 2 | (890, 800) |   |   |   |   |   |   |   |   |   |
| 1 | (890, 800) |   |   |   |   |   |   |   |   | (600, 0) |
| 0 |   |   |   |   |   |   |   |   |   | (600, 0) |

FIG. 10
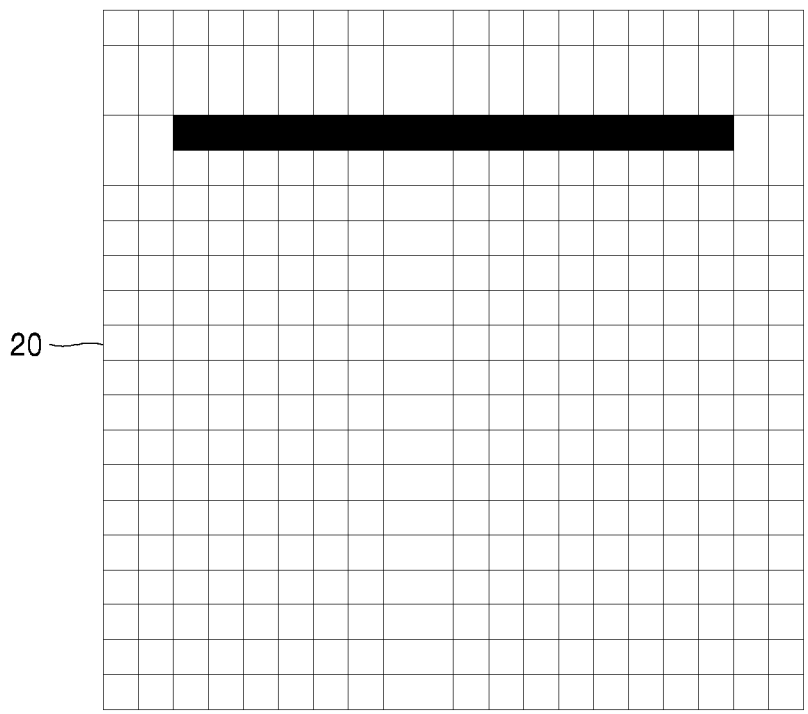
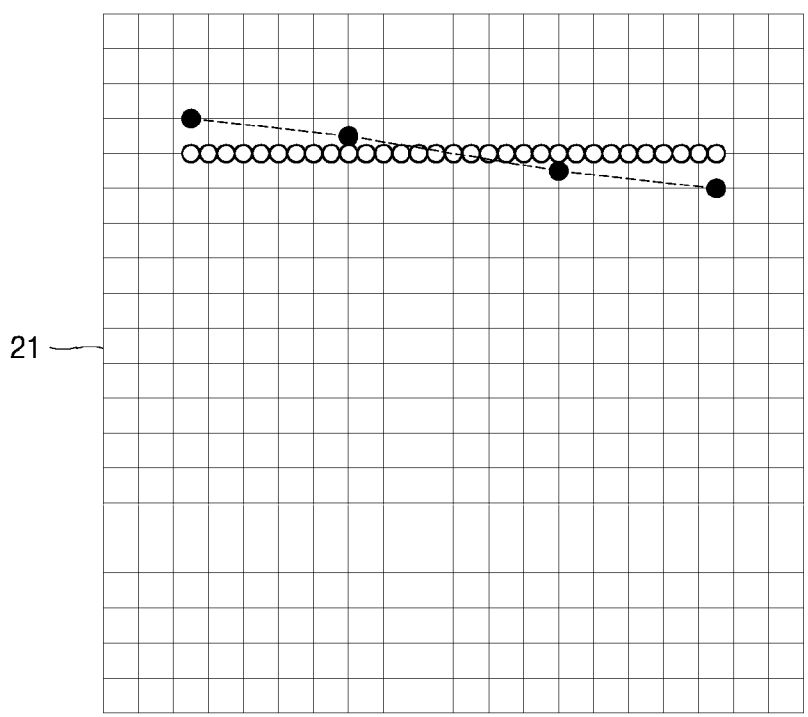
● : Object sensed by lidar sensor
○ : Object sensed by depth sensor FIG. 16
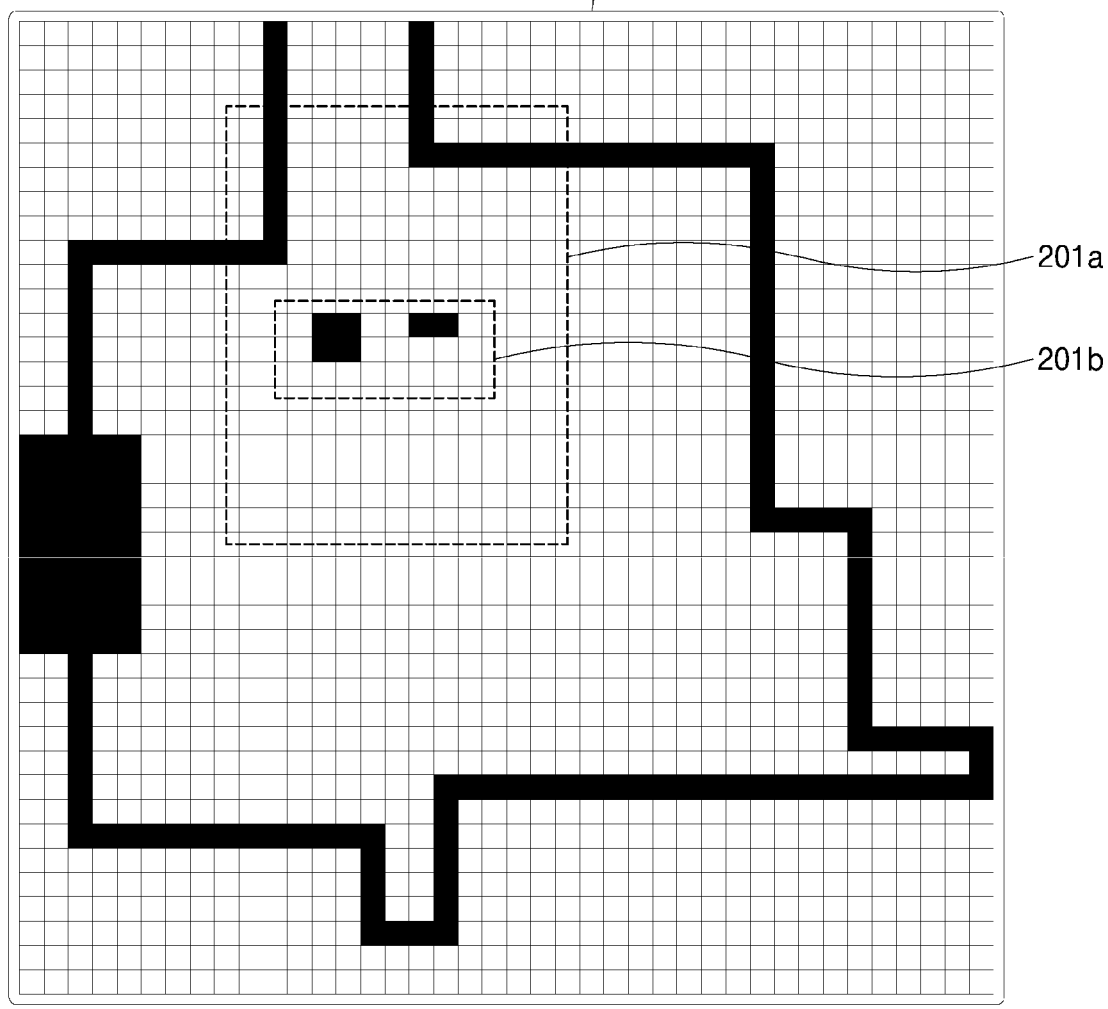
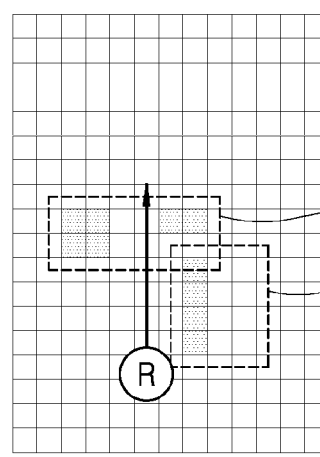

METHOD FOR IDENTIFYING MOVING OBJECT IN THREE-DIMENSIONAL SPACE AND ROBOT FOR IMPLEMENTING SAME

CROSS REFERENCE TO RELATED APPLICATIONS

This application is the National Phase of PCT International Application No. PCT/KR2018/005747, filed on May 18, 2018, which claims priority under 35 U.S.C. 119(a) to Patent Application No. 10-2017-0076120, filed in the Republic of Korea on Jun. 15, 2017, all of which are hereby expressly incorporated by reference into the present application.

FIELD

The present disclosure relates to a method for identifying a moving object in a 3-dimensional space and a robot for implementing the same.

DESCRIPTION OF RELATED ART

In order to operate a robot in a space where movements of people and objects are actively occurring, such as an airport, a school, a public office, a hotel, a company office, or a factory, the robot must have a map of an entirety of the space. In one example, the map may be constructed in a two dimension. However, when the robot has a predetermined height, obtaining three-dimensional information about the space may allow accuracy of robot movement to be increased.

In particular, structures are not uniformly arranged in a space where movements of people and objects are actively occurring, such as airport, a school, a public office, a hotel, a company office, or a factory. Further, a temporary structure such as a guide desk may be installed and then removed. The moving object may have varying heights.

Therefore, in order to create a 3-dimensional map reflecting the heights of the external objects, it is necessary for the robot to collect and adjust information sensed in various ways to generate an accurate map.

DISCLOSURE

Technical Purposes

The present disclosure is to solve the above-mentioned problem, and thus is to generate positional information and height information of objects disposed in a space using two or more sensors to generate a 3-dimensional map reflecting the generated information.

Further, the present disclosure aims to identify moving object that are constantly moving or disappearing so that only stationary objects may be stored on a 3-dimensional map to increase movement efficiency of a robot.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

Technical Solutions

A robot in accordance with one embodiment of the present disclosure includes a sensor module configured to calculate height and position information of an object using two or more sensors; a service-providing device configured to provide a predefined service; a driver configured to move the robot; a map storage for storing a 3-dimensional map including height and position information of an object calculated by the sensor module in a space in which the robot moves; and a controller configured to control the sensor module, the service-providing device, the driver, and the map storage, wherein the controller is configured to: convert the height and position information of the object calculated by the sensor module into global coordinates; and store the height and position information of the object into the 3-dimensional map in a form of the global coordinates.

A robot in accordance with another embodiment of the present disclosure includes a sensing module including: a lidar sensor coupled to the robot to calculate a physical distance between an object and the robot and angle information between the object and the robot; a depth sensor to calculate depth information of an object in one direction from the robot; and an ultrasound sensor for sensing a distance of an object within a predetermined radius around the robot, wherein the sensor module is configured to calculate height and position information of an object using two or more sensors of the lidar, depth, and ultrasound sensors; a map storage configured to store therein a 3-dimensional map, wherein the map is generated by combining a 2 dimensional (2D) lidar sensor map generated by the lidar sensor and a 3 dimensional (3D) depth sensor map generated by the depth sensor with each other; and a controller configured to: store at least one of a first object, a second object, or a third object in the 3D map, wherein the first object is commonly sensed by the two or more sensors, wherein a second object is placed at a height at which an object is not sensed by the lidar sensor, and the second object is sensed by the depth sensor, wherein the third object is not sensed by the depth sensor but is sensed by the lidar sensor; identify an object not sensed within the radius among objects stored in the 3-dimensional map; and determine the identified object as a moving object and remove the moving object from the 3-dimensional map.

A method for identifying a moving object in a 3D space in accordance with still another embodiment of the present disclosure includes calculating height and position information of an object using two or more sensors of a sensor module of a robot; converting, by a controller of the robot, the height and position information of the object calculated by the sensor module into global coordinates; generating, by the controller, a 3-dimensional map including the height and position information of the object in a form of the global coordinates and storing, by the controller, the 3D map into a map storage of the robot; and identifying a moving object based on one or more sensing results sensed by the two or more sensors of the sensor module, and removing the moving object from the 3-dimensional map stored in the map storage.

Technical Effects

When applying the embodiments of the present disclosure, calculating information such as the heights and depths of the objects placed around the robot while the robot is moving may allow the robot to move without collisions.

Further, when applying the embodiments of the present disclosure, the robot may combine the various sensing results from the sensors to correct an error of the sensed data from a specific sensor.

Further, when applying the embodiments of the present disclosure, the objects of various heights are sensed and added to or deleted from the map based on a moving or stationary state thereof so that the robot may accurately identify arrangements of the objects in the entire space and may move based on the identifying result.

Effects of the present disclosure are not limited to the above defined effects. Those skilled in the present disclosure may readily derive various effects of the present disclosure from configurations as disclosed in the present disclosure.

BRIEF DESCRIPTION OF DRAWINGS

FIG. 7 is a diagram showing a state in which an object sensed by a depth sensor is reflected on a map according to an embodiment of the present disclosure.

FIG. 8 is a diagram in which both a bottom level and a top level of an object sensed by a depth sensor are reflected on a map according to one embodiment of the present disclosure.

FIG. 10 shows a process of aligning sensing results obtained from two sensors with each other according to one embodiment of the present disclosure.

FIG. 16 and FIG. 17 show a lidar sensor map, a depth sensor map, and a 3-dimensional map according to one embodiment of the present disclosure.

DETAILED DESCRIPTIONS

Figure 1:
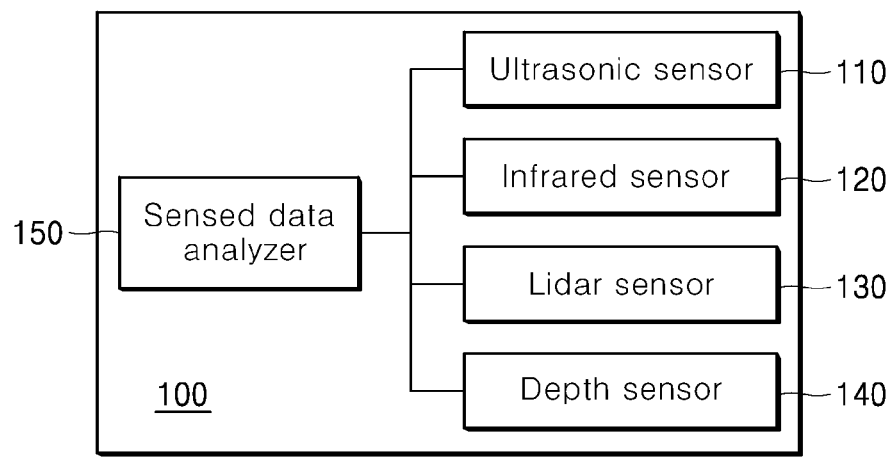
FIG. 1 illustrates a configuration of a sensor module that senses a space in a three dimension according to an embodiment of the present disclosure.

Hereinafter, exemplary embodiments of the present disclosure will be described in detail with reference to the accompanying drawings so that those skilled in the art may easily implement the present disclosure. The present disclosure may be embodied in many different forms and should not be construed as limited to the embodiments set forth herein.

In order to clarify the present disclosure, the present disclosure has omitted components not related to the description. Like reference numerals designate like or similar components throughout the specification. Further, the embodiments of the present disclosure will be described in detail with reference to exemplary drawings. In allocating reference numerals to components of each drawing respectively, the same component may have the same reference numeral even though the same component is displayed on different drawings. Further, well-known methods, procedures, and components have not been described in detail so as not to unnecessarily obscure aspects of the present disclosure.

It will be understood that, although the terms "first", "second", "A", "B", "(a)", "(b)" and so on may be used herein to describe various elements, components, regions, layers and/or sections, these elements, components, regions, layers and/or sections should not be limited by these terms. These terms are used to distinguish one element, component, region, layer or section from another element, component, region, layer or section. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Further, in implementation of the present disclosure, for convenience of explanation, a single component may be divided into sub-components. In this connection, components may be implemented in a single device or module. Alternatively, a single component may be divided into sub-components which are distributed in multiple devices or modules respectively.

Hereinafter, according to the present disclosure, a robot may include a device having a specific purpose (cleaning, security, monitoring, guidance), or providing a service based on characteristics of a space in which the robot moves. Thus, the robot according to the present disclosure collectively refers to an apparatus that has movement means for moving the same using predefined information and sensors and is configured to provide a predefined service.

In accordance with the present disclosure, the robot may move while using a map. The map refers to information about stationary walls, stairs, etc. that have been identified as not moving in a space. Further, the robot may store information about separate objects on the map. For example, a guide platform attached to a stationary wall, a newly installed vending machine, etc. have heights. Thus, the height information thereof needs to be stored in the map.

Further, in accordance with the present disclosure, the robot stores a space three-dimensionally so that even when a wall or glass is positioned in a three dimension, the robot checks whether a region related to the wall or glass is an accessible region or a serviceable region, and stores the checking result.

In particular, the present disclosure discloses embodiments in which a 3-dimensional map is generated by adjusting information sensed by two or more sensors.

FIG. 1 illustrates a configuration of a sensor module that senses a space in a three dimension according to an embodiment of the present disclosure. One or more sensor may be mounted on the robot.

The sensor module 100 includes sensing components such as an ultrasound sensor 110, an infrared sensor 120, a lidar sensor 130, and a depth sensor 140, and a sensed-data analyzer 150 for analyzing sensed values. Since each of the components constituting the sensor module 100 acts as a logical component, the components do not necessarily need to be physically implemented in the same location. For example, the infrared sensor 120 may be placed in a boundary region of the robot. The ultrasound sensor 110 may be placed in a front center region of the robot. Further, the depth sensor 140 and lidar sensor 130 may be placed on a top of the robot.

Further, the sensors and sensed-data analyzer 150 may transmit and receive the sensed information with each other via a data link or wirelessly. Further, each sensor may be a collection of various sub-sensors. For example, in order for the infrared sensor 120 to sense an object disposed in front of the robot, a pair or a plurality of infrared transmitters and infrared receivers may be physically arranged. The pair or plurality of infrared transmitters and infrared receivers may be logically integrated into the single infrared sensor 120. Similarly, a pair or a plurality of ultrasound transmitters and ultrasound receivers may be physically arranged and may be logically integrated into the single ultrasound sensor 110.

In accordance with the present disclosure, the robot may create a 3-dimensional map so that the robot may easily avoid obstacles while moving. To this end, in an embodiment of the present disclosure, the robot generates a 3-dimensional map by combining data from various types of sensors. In particular, the robot may generate a reliable 3-dimensional map by considering, for example, a sensed portion for which a sensing accuracy is affected by reflectance, transmittance of light or external light, or a height of an obstacle, etc.

To this end, the present disclosure will refer to a process of combining two types of sensed data (lidar and depth) and performing SLAM based on the combined result to create a map. Further, the present disclosure will refer to a process of removing a moving object from the map. In accordance with the present disclosure, a lidar-depth SLAM may be performed to generate an accurate 3-dimensional map in an large area of a space where the robot moves Creating the 3-dimensional map by combining a sensing result sensed from the lidar sensor 130 and a sensing result sensed from the depth sensor 140 may be an embodiment of the present disclosure. In another example, the infrared sensor 120 may be used instead of the lidar sensor 130. For example, multiple infrared sensors 120 may be placed and may transmit infrared signals at a predetermined angular spacing and may receive signals. Then, an object may be sensed in a point manner as in the lidar sensor 130 depending on characteristics of the received signals.

In addition, the infrared sensor 120 may be used instead of the depth sensor 140. Infrared sensors 120 may be respectively placed at various vertical levels of the robot 1000 to sense height information of front objects or objects within a predetermined distance among objects sensed by the lidar sensor 130. Then, the robot may combine information of objects sensed by the infrared sensors 120 and information sensed by the lidar sensor 130 such that the 3-dimensional map may be generated.

In accordance with the present disclosure, the robot equipped with the sensing module 100 as shown in FIG. 1 may generate a three-dimensional map of an entire space. In this process, an unnecessary moving object may be temporarily displayed on the map. Then, when the robot moves away from the moving object or the moving object disappears, the moving object may be removed from the map. The robot may sense both the moving object and a stationary object. In order to increase the sensing accuracy, the robot may increase a weight of specific information among information sensed using the sensors or may select some pieces of information.

The stationary object may be a fixed object in a building of a space such as a wall, a door, a glass window, while the moving object may be a person, an object (carrier or transportation apparatus) carried by a person, or a temporarily installed object. In accordance with the present disclosure, in the process of creating the 3-dimensional map, the moving object that is temporarily sensed may be removed from the map after the robot moves. Each of the sensors will be described in more detail.

In one embodiment of the present disclosure, the ultrasound sensor 110 may determine whether the moving object or stationary object exists around the robot. The ultrasound sensor 110 may include an ultrasound emitter that emits ultrasound and an ultrasound receiver that receives an echo reflected from an obstacle when the emitted ultrasound collides therewith. The ultrasound sensor 110 may detect an obstacle and calculate a distance to the obstacle using the ultrasound emission and reception time duration.

However, the ultrasound sensor 110 does not detect an exact height of the obstacle. Therefore, information of the obstacle sensed by the ultrasound sensor 110 may be used to determine the distance to the obstacle and thus determine distance information along a axis (X-Y) along that the robot moves. The ultrasound sensor 110 determines whether there are moving or stationary objects around the robot. Thus, the ultrasound sensor 110 may detect an object that may not be sensed by the depth sensor 140 or the lidar sensor 130.

Next, the infrared sensor 120 may sense an object of a predetermined height in front of the robot. For example, when the infrared sensor 120 is placed on each of both ends of a top of the robot, the sensor 120 may detect whether there are objects having a vertical level equal to a top level of the robot. In accordance with the present disclosure, in order to increase the sensing accuracy of the robot, the infrared sensors 120 may be distributed along the height of the robot. For example, when the height of the robot is H, a number of infrared sensors 120 may be respectively arranged at vertical levels such as H/3, 2*H/3, and H, so that objects may be sensed at various vertical levels along a total height of the robot.

In another embodiment, the infrared sensor 120 may be disposed at each of both ends of a bottom of the robot. The sensor 120 may sense an obstacle placed at a bottom level and in front of the robot to determine whether the robot may pass through the obstacle.

The lidar sensor 130 scans an obstacle placed at a specific vertical level. Therefore, when the specific height, for example, a height where the lidar sensor is placed is H1, objects may be sensed based on H1. However, the lidar sensor 130 may not sense an object placed at a higher or lower position than H1. In one example, the lidar sensor 130 may sense an obstacle in a very long sensing distance and in a wide range covering up to 270 degrees or 360 degrees. Accordingly, the lidar sensor 130 sense an obstacle in a wide range to generate a map. This map may contain positions of obstacles placed at specific heights.

The depth sensor 140 senses a distance to an obstacle disposed in front of the robot. The depth sensor 140 may sense a distance to a photographed object on a reference region (for example, a pixel) basis to generate a photographed image in which three-dimensional distance information is reflected. Since a sensing range thereof is not limited to a specific height, the depth sensor 140 may identify an obstacle at a height where the infrared sensor 120 is not disposed. In particular, the robot may determine, based on the information sensed by the depth sensor 140, whether the obstacle as sensed by the infrared sensor 120 vertically extends in an elongate manner.

Further, the sensing information of the lidar sensor 130 and the depth sensor 140 may be collected to identify a space where a glass is placed. The depth sensor 140 may not achieve 100% accuracy of sensing a light transmissive glass. Thus, the robot may combine a value sensed by the lidar sensor 130 and a value sensed by the depth sensor 140 to identify a space in which an object such as a glass is present.

Hereinafter, an obstacle disposed at a vertical level corresponding to a upper, middle, or lower level of the robot may be sensed by the infrared sensor 120. The ultrasound sensor 110 may detect an object disposed in front of the robot. The information generated using a depth value of an object disposed in front of the robot as detected by the depth sensor 140 may be referred to as depth information. Therefore, the depth sensor 140 may collect a boundary line and distance information of the aforementioned objects and calculate an overall outline of the obstacle and the depth information of the objects based on the collected information.

The sensor module 100 in FIG. 1 calculates height and position information of an external object using two or more sensors. For example, both the lidar sensor 130 and the depth sensor 140 may be used, or both the infrared sensor 120 and the depth sensor 140 may be used.

Figure 2:
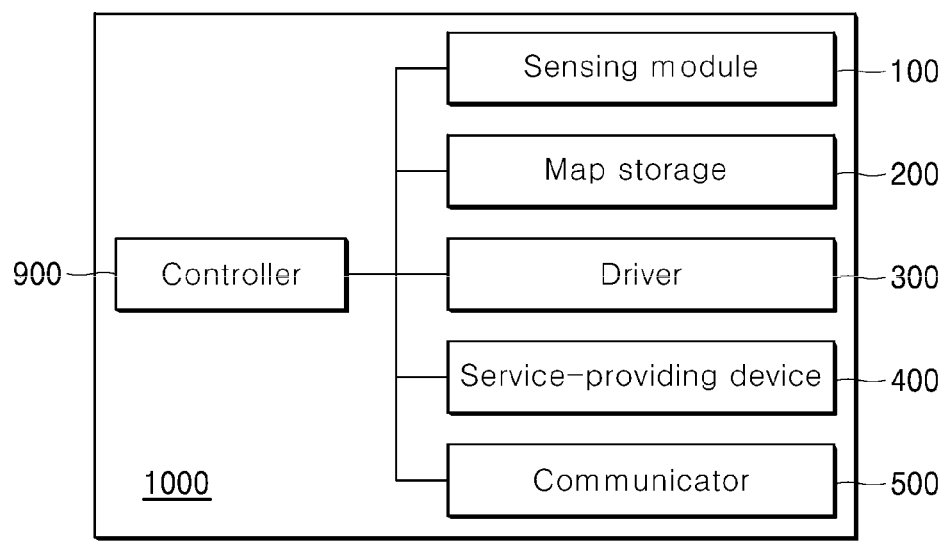
FIG. 2 shows a configuration of a robot according to one embodiment of the present disclosure.

FIG. 2 shows a configuration of a robot according to one embodiment of the present disclosure. The robot 1000 may include a sensor module 100 that senses objects placed outside the robot, such as moving object and stationary objects, a map storage 200 for storing a map, a driver 300 that moves the robot and control the movement mechanically or electronically, a service-providing device 400 that performs a predefined service of the robot, a communicator 500 that sends and receives information about the map or objects to and from other robots, and a controller 900 that controls each of these components.

In particular, the controller 900 converts the height and position information of the object as calculated by the sensor module 100 into global coordinates and stores the height and position information of the object into the 3-dimensional map in the global coordinate form. Based on a sensing result of one or more of various sensors of the sensor module 100, the controller may remove a moving object among the objects stored in the map storage from the 3-dimensional map. In the removal process, the controller may use the ultrasound sensor 110 to identify presence or absence of an object in a region that the depth sensor 140 may not detect.

The driver 300 may be configured for moving the robot 1000 and may include a wheel. The driver 300 moves the robot 1000 under control of the controller 900. In this case, the controller 900 may check a current position of the robot 1000 using the information stored in the map storage 200 and may provide a movement signal based on the current position to the driver 300. Further, the controller 900 may analyze the information about the external objects sensed by the sensor module 100 and may check whether objects to collide with the robot are placed in a moving path of the robot in a moving direction thereof and then may control the movement of the driver 300 based on the checking result.

The service-providing device 400 may be configured to provide a specialized service of the robot. For example, when the robot is a cleaning robot, the service-providing device 400 includes components necessary for cleaning. When the robot is a guide robot, the service-providing device 400 includes components necessary for guidance. The service-providing device 400 may include various components based on a service provided by the robot. Further, the controller 900 may control the service-providing device 400 to perform a specific service or control the service-providing device 400 not to perform a service, depending on sizes and characteristics of the external objects or a space in which the robot is traveling.

The communicator 500 sends the generated map to another robot or a server or receives a new map therefrom. In addition, in a process of aligning the results sensed by the sensors with each other, the communicator 500 may send information about a sensor in which an error occurs to the server.

The map storage 200 stores a map therein. The map may refer to information about a space where the robot 1000 may move. The map divides an entire space into subdivided unit regions and stores height information of each object placed in each unit region. an example of configuring the height information may include a method of storing the highest height value and a method of storing a bottom level and a top level of the object. This will be described later.

The map storage 200 stores 3-dimensional maps created during the robot's movement. The 3-dimensional map may be stored cumulatively. The controller 900 may generate a single map using the accumulated maps.

The map may be constructed in a variety of ways. In one embodiment, an entire space is defined by X and Y axes. A entire region defined by the X and Y axes may be divided into sub regions. Then, a height of an object sensed in each sub region may be stored. The height of the object sensed based on a height of the robot is stored. Thus, objects at positions higher than a height at which the robot may pass through are not stored in the map.

A height of an object may be stored as a value of a two-dimensional matrix. Alternatively, a height of an object may be stored as a pair of two values in the two-dimensional matrix. In one embodiment, a bottom level value and a top level value may be stored. This will be described later.

In FIG. 2, the map storage 200 is included in the robot 1000. According to another embodiment, the map storage 200 may be included in a server. In this case, the robot 1000 may receive the map stored on the server in real time or at a regular time interval via communication with a communicator of the server. Further, the robot 1000 may send information to be further stored to the server.

The map stored in the map storage 200 may use values sensed by the sensor module 100 of the robot 1000.

In one embodiment, the map may be generated based on values sensed using the lidar sensor. For example, In FIG. 1, the lidar sensor may be further placed so that the robot may continuously create and update the map. Further, the lidar sensor may provide information necessary to construct the map using other sensors 110, 120, and 140 to grasp information about a protrusion.

Figure 3:
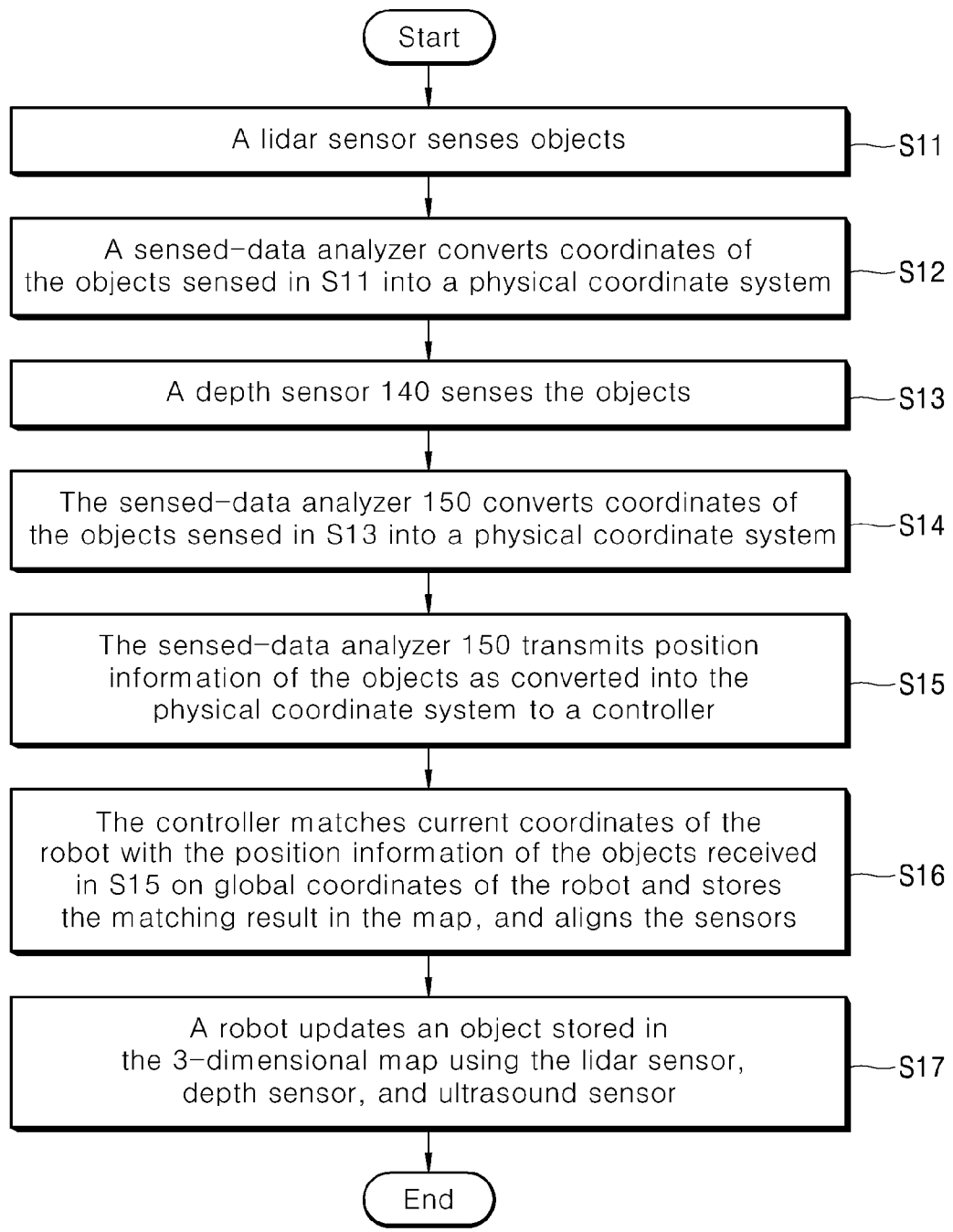
FIG. 3 illustrates a process of generating a 3-dimensional map using two or more sensors according to an embodiment of the present disclosure.

FIG. 3 illustrates a process of generating a 3-dimensional map using two or more sensors according to an embodiment of the present disclosure. In one embodiment, the lidar sensor 130 and the depth sensor 140 sense objects (surrounding objects).

First, the lidar sensor 130 senses objects S11, and then the sensed-data analyzer 150 converts coordinates of the objects sensed in S11 into a physical coordinate system S12. As used herein, the conversion into the physical coordinate system means calculating x and y values based on a position of the robot. In one embodiment, x may denote a distance from the robot to an object in a x direction, that is, front direction, while y may denote a distance from the robot to an object in a y direction, that is, lateral direction.

Next, the depth sensor 140 senses the objects S13. Similarly, the sensed-data analyzer 150 converts coordinates of the objects sensed in S13 into the physical coordinate system S14. In this connection, the depth sensor 140 may include height information of objects into the above-described physical coordinate system.

The sensed-data analyzer 150 transmits the position information of the objects as converted into the physical coordinate system to the controller 900 S15.

The controller 900 matches current coordinates of the robot with the position information of the objects received in S15 on global coordinates of the robot and stores the matching result in the map, and aligns the sensors S16.

That is, S16 calculates how far the coordinates of the objects as sensed by the lidar sensor 130 and the depth sensor 140, that is, as detected by the sensor module 100 of the robot are located from a center of the robot in the x and y directions, and the stores the calculation result in the 3-dimensional map. The sensor alignment refers to a process of comparing the sensed values generated by two or more sensors and checking whether there is an error in each of the sensors based on the comparison result.

The robot then updates an object stored in the 3-dimensional map using the lidar sensor 130, depth sensor 140, and ultrasound sensor 110 S17. Updating the object stored in the map means deleting an object identified as a moving object from the map. As the robot moves, the sensor module 100 continuously senses objects. In this process, objects stored in a previous map but no longer sensed may be removed from a current map. That is, when an moving object disappears or when the robot moves further and the sensor module no longer senses the object, this moving object may be removed from the current map.

The process in FIG. 3 will be described in detail. The controller 900 may generate a map of the objects created by each of the sensors using values provided by each of the sensors. In an embodiment, the position information of the objects as sensed by the lidar sensor 130 may be stored in a lidar sensor map. The position and height information of the objects sensed by the depth sensor 140 may be stored in a depth sensor map.

The lidar sensor 130 senses objects of a height at which the lidar sensor 130 is placed on the robot 1000. Therefore, the controller 900 may store information of objects provided by the lidar sensor in a two-dimensional lidar sensor map. In one example, two lidar sensors 130 are placed on robot 1000. When the two lidar sensors 130 are arranged at different heights, the objects sensed in each of the two lidar sensor maps may be stored. Alternatively, the position and height information of the objects reflecting heights of the objects sensed by the lidar sensors 130 may be stored in the 3D lidar sensor map.

In one example, the height information of the objects sensed from the depth sensor 140 include the depth information. Thus, the objects sensed by the depth sensor 140 may be stored in a three-dimensional depth sensor map.

Figure 4:
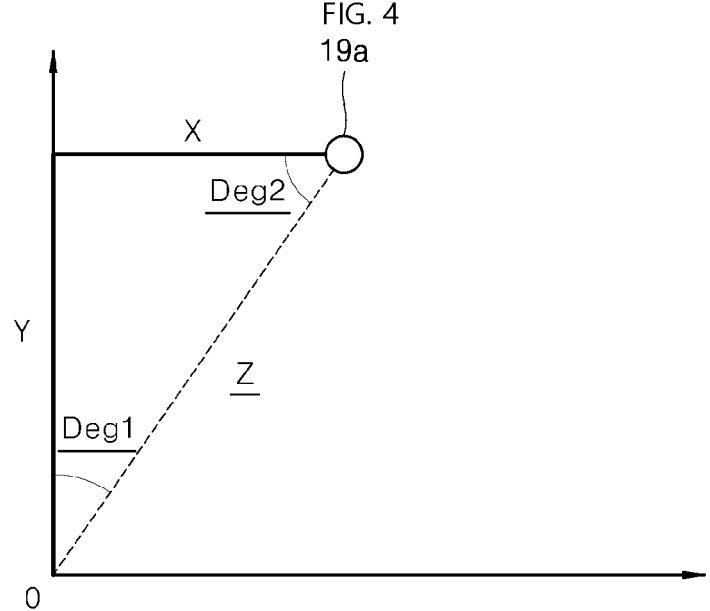
FIG. 4 illustrates a process in which a lidar sensor senses an external object and converts the sensed object to a physical coordinate system according to an embodiment of the present disclosure.

FIG. 4 illustrates a process in which a lidar sensor senses an external object and converts the sensed object to a physical coordinate system according to an embodiment of the present disclosure. FIG. 4 shows the S12 process in FIG. 3.

The lidar sensor 130 senses an object 19a while being present at a position 0. The lidar sensor 130 may detect Deg1, Deg2, and z values using angle information and a distance value of the sensed object 19a. As a result, the x and y values of the object 19a in a physical coordinate system centered on a position of 0 may be calculated using a following equation.

$$x = \cos Deg2 * z$$

$$y = \cos Deg1 * z \quad \text{[Equation 1]}$$

When the x and y values are obtained, a position of the object 19a on the map may be stored on the map as in S15 of FIG. 3.

In particular, the lidar sensor 130 may calculate the Deg1, Deg2, and z values of the object as sensed in a range including at least 270 degrees and at most 360 degrees, and within a maximum sensing distance (for example, 30 meters or 50 meters). Thus, the lidar sensor 130 may use the calculation result to store the position of the object around the robot on the map. In one example, the lidar sensor 130 stores objects sensed only at specific heights on the map. Thus, the positions on the map of the objects as generated by the lidar sensor 130 may be stored on the map in a two-dimensional form.

Each of the positions of the objects stored on the map refers to an absolute position in a space in a global coordinate system. That is, a position value of the object sensed by the lidar sensor 130 is a relative value to a position of the robot. However, converting the relative value to the global coordinate system results in an absolute position in an entire space represented by the map. Depending on a sensing accuracy of the lidar sensor 130, the sensed data may increase or decrease at a high resolution. FIG. 4 is based on the lidar sensor 130. However, this principle may be applied to sensors that sense a position of an object in a point manner, such as the infrared sensor 120.

Figure 5:
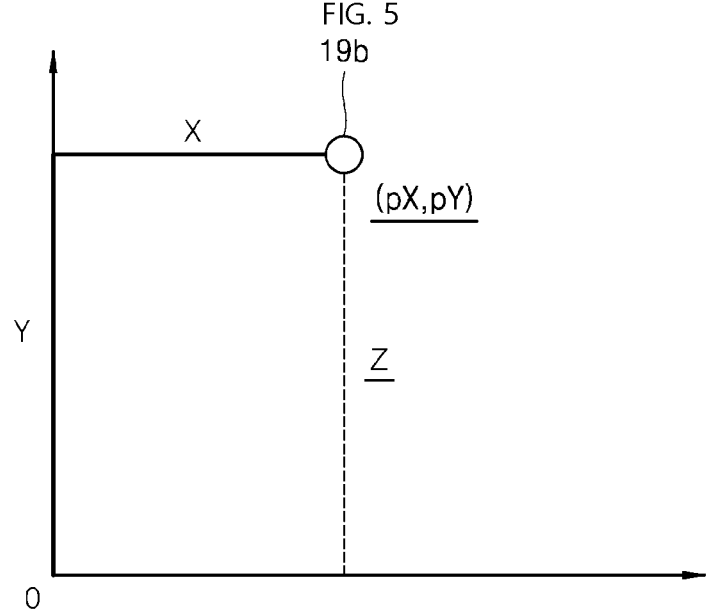
FIG. 5 illustrates a process in which a depth sensor senses an external object and converts the sensed object to a physical coordinate system according to an embodiment of the present disclosure.

FIG. 5 illustrates a process in which a depth sensor senses an external object and converts the sensed object to a physical coordinate system according to an embodiment of the present disclosure. FIG. 5 shows the S14 process in FIG. 3.

The depth sensor 140 calculates a depth value of each of the objects in front of the robot while being present at a position 0. For example, the depth sensor 140 may calculate pixel position (pX, pY) values and a distance value z of an object 19b in a depth image including the object 19b. Thus, the depth sensor 140 may use the calculation result to calculate the x and y values based on a position of the depth sensor 140.

First, the depth sensor 140 has no angle information. They and z values are equal to each other as shown in FIG. 5. That is, y=z as a value sensed by the depth sensor 140. Thus, y may be used as it is. In order to calculate the x value, information on a sensing region of the depth sensor 140 may be checked. In one embodiment, an around map around obstacles within 3 meters in front of the robot may be stored. Then, the x value may be calculated therefrom.

In one embodiment, the depth sensor 140 detects a horizontal region of 3.45 m at a distance 3 m in front of the robot. The depth sensor 140 detects a horizontal region of 2.30 m at a distance 2 m in front of the robot. Further, when the depth sensor 140 detects a horizontal region of 1.15 m at a distance 1 m in front of the robot. The depth sensor 140 may use these information to calculate a proportional relation of "y=1.15x". Based on this proportional relation, x may be calculated using a distance value of a detected pixel, and y may be calculated using a horizontal distance sensed by the depth sensor 140 at a distance of a detected object. Based on those calculation results, a horizontal length of a single pixel may be calculated using a resolution of the depth sensor 140, for example, 320.

The x and y values calculated in FIG. 5 may be converted to global coordinates on a map of an entire space centered on a position of the robot, as described in FIG. 4. The depth sensor 140 has the height information of the object. That is, a vertical distance corresponding to a pixel may be calculated via application of a vertical distance in a similar manner to the calculation of the horizontal distance as described above, and then the height information of the object may be calculated based on the vertical distance.

When objects of a height where the lidar sensor 130 is installed on the robot are sensed by both the lidar sensor 130 and the depth sensor 140, object information is registered on the 3-dimensional map according to sensing priorities of the lidar sensor 130 and the depth sensor 140. In an embodiment, the controller may register object information, that is, a position of an object on the map such that a sensing result of the depth sensor 140 may be prioritized to be registered on the map in a short distance, while a sensing result of the lidar sensor 130 may be prioritized to be registered on the map in a long distance. Alternatively, when a reflection intensity of light is not uniform, for example, when a material of the object is identified to absorb or transmit light, the controller may register object information, that is, a position of an object on the map such that a sensing result of the depth sensor 140 may be prioritized to be registered on the map. On the contrary, when the external light is strong and thus the depth sensor 140 may not detect the object accurately, the controller may register object information, that is, a position of an object on the map such that a sensing result of the lidar sensor 130 may be prioritized to be registered on the map.

In this process, a moving object may be deleted from the map. For example, because the lidar sensor 130 only senses objects of a predetermined height in a process of continuously updating the position information of the objects at a rate 20 m/s, the lidar sensor 130 may delete objects moving and thus disappearing from the map.

To the contrary, a region that the depth sensor 140 may not sense may be present depending on a position thereof on the robot 1000. In this case, the moving and thus disappearing objects may not be deleted from the map. For this reason, in accordance with the present disclosure, the controller may first register position information, or position and height information of objects sensed by the lidar sensor 130 and depth sensor 140 on the map. Then, the ultrasound sensor 110 may sense all objects within a predetermined distance (for example, 1 meter) in real time. Then, objects not detected within the predetermined distance may be deleted from the object information on the 3-dimensional map as registered from the depth sensor 140.

When only one sensor among the lidar sensor 130 and depth sensor 140 is used, an error may not be found when the error occurs in position information of the sensed objects. However, as shown in FIG. 3, when the lidar sensor 130 provides an incorrect sensing value while a depth value is correctly mapped onto previous map information, the controller 900 of the robot 1000 may calculate an error value of the incorrect sensing value and may correct the error. In this way, a variety of sensors in various applications may be used in a combined manner.

As shown in FIG. 4 and FIG. 5, each of the lidar sensor 130 and depth sensor 140 may generate and return information such as the distance and angle of the object. The lidar sensor 130 and depth sensor 140 may express the information in different forms. For example, the lidar sensor 130 generates the angle information and distance value of the sensed object, while the depth sensor 140 generates the X, Y coordinate values and the distance value around the depth sensor 140. Therefore, in accordance with the present disclosure, the robot may align positions of objects as detected by two sensors to accurately generate a 3-dimensional map, as shown in FIG. 6 to FIG. 10 to be described later.

Figure 6:
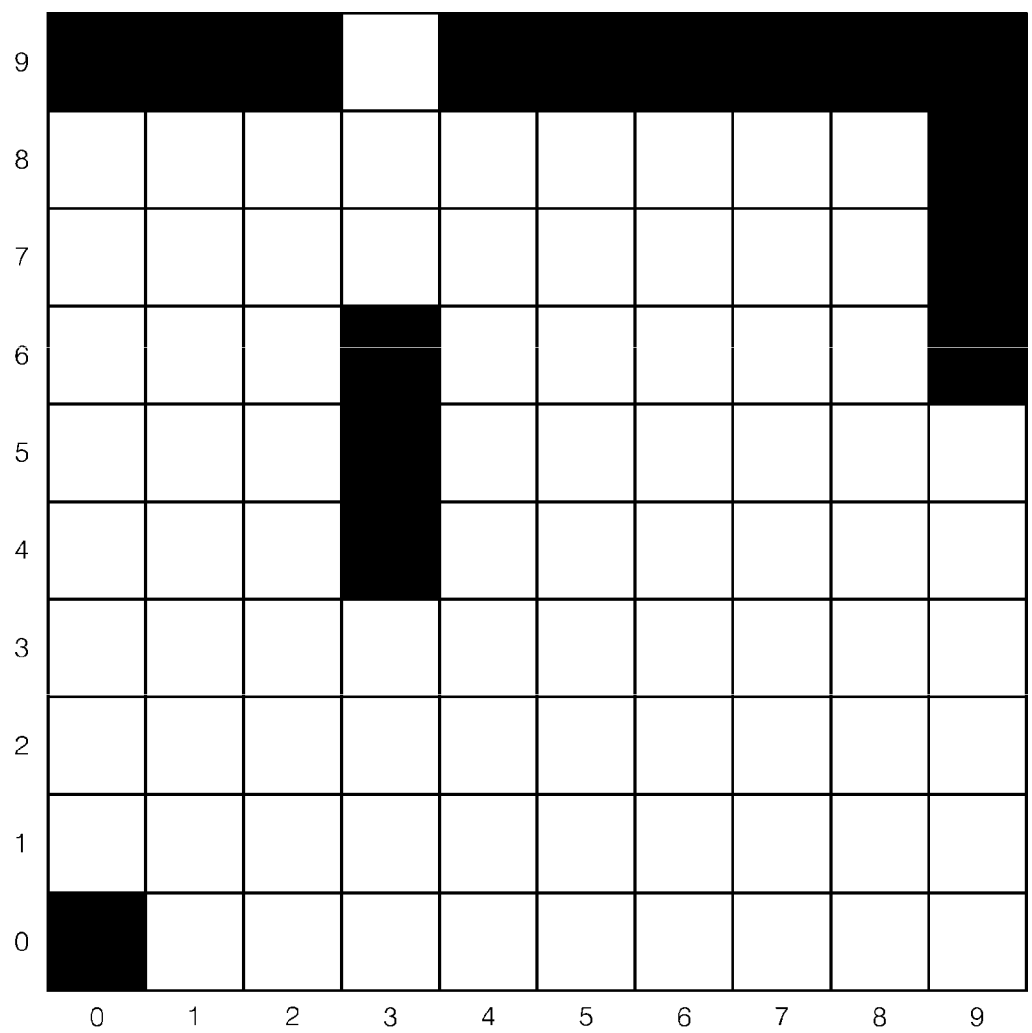
FIG. 6 is a diagram showing a state in which an object sensed by a lidar sensor is reflected on a map according to an embodiment of the present disclosure.

FIG. 6 is a diagram showing a state in which an object sensed by a lidar sensor is reflected on a map according to an embodiment of the present disclosure. In FIG. 6, an entire space is composed of a 10×10 cells map. The controller may check whether an object is sensed on a cell basis. In one embodiment, a region marked black in FIG. 6 refers to a position on the map of an object sensed at a height at which the lidar sensor 130 is placed on the robot. FIG. 6 shows sensed objects when the lidar sensor 130 is placed at a H height on the robot.

In one example, according to another embodiment of the present disclosure, when two or more lidar sensors are disposed at different heights or when the lidar sensor and the infrared sensor are disposed at different heights, height information of an external object may be calculated. For example, a first lidar sensor that may sense a 360 or 270 degrees range may be disposed on a top of the robot 1000, while a second lidar sensor that may sense a 180 degrees or smaller range or an infrared sensor is placed at a bottom of the robot 1000. Thus, objects at the two heights may be detected. In this case, multiple temporary maps (lidar sensor maps) may be created that store positions of objects at a specific height in FIG. 6.

FIG. 7 is a diagram showing a state in which an object sensed by a depth sensor is reflected on a map according to an embodiment of the present disclosure. As shown in FIG. 3 and FIG. 5, the depth sensor 140 may calculate height information of the sensed object. Therefore, FIG. 7 shows a map with the height information. FIG. 6 shows a result of sensing a space sensed by the lidar sensor 130 using the depth sensor 140.

A height value displayed in each cell in FIG. 7 represents a height of an object sensed by the depth sensor in mm. When assuming that in FIG. 6, H is 1000 and a height value sensed by the lidar sensor 130 is 1000 mm, a numeric value smaller than 1000 in FIG. 7 refers to a height of an object sensed only by the depth sensor 140.

Further, regarding an object (for example, having 1500 and in a cell (3, 9)) that has a numeric value greater than 1000 and is not sensed by the lidar sensor 130 but is sensed only by the depth sensor 140, a bottom level of the object is larger than 1000 or, alternatively, an error occurs in a sensing process by the lidar sensor 130. Therefore, the controller may check an external appearance of the object depending on which sensor has sensed the object.

In one example, in order to store 3D information on the map more accurately, the height information may be subdivided such that a top level and a bottom level are stored therein together.

FIG. 8 is a diagram in which both a bottom level and a top level of an object sensed by a depth sensor are reflected on a map according to one embodiment of the present disclosure. FIG. 8 shows bottom levels of the objects in FIG. 7. Each cell in FIG. 8 contains two values: a top level value and a bottom level value. In FIG. 8, when the bottom level is 0, this means an object attached to a bottom surface such as a post. On the contrary, when the bottom level is greater than 0, this means an object that is floating but is not attached to the bottom face. For example, regarding an object protruding from a wall, a bottom level value thereof may be greater than zero.

When comparing FIG. 6 and FIG. 7, or FIG. 6 and FIG. 8 with each other, an object in a cell (0, 0) is sensed by the lidar sensor 130 but is not sensed by the depth sensor 140. This is because the depth sensor 140 could not detect the object due to external light or due to a blind spot of the depth sensor 140. To the contrary, in FIG. 7 and FIG. 8, the objects in a region whose height is not 1000 mm are sensed by the depth sensor 140. Therefore, when using two or more sensors, an object that a single sensor using a specific signal may not sense may be sensed, thereby increasing the sensing accuracy of external objects. In particular, in FIG. 7 and FIG. 8, the robot 1000 may check positions of the objects detected only by the depth sensor 140 and thus may move while avoiding obstacles at the low height based on the checking result.

Figure 9:
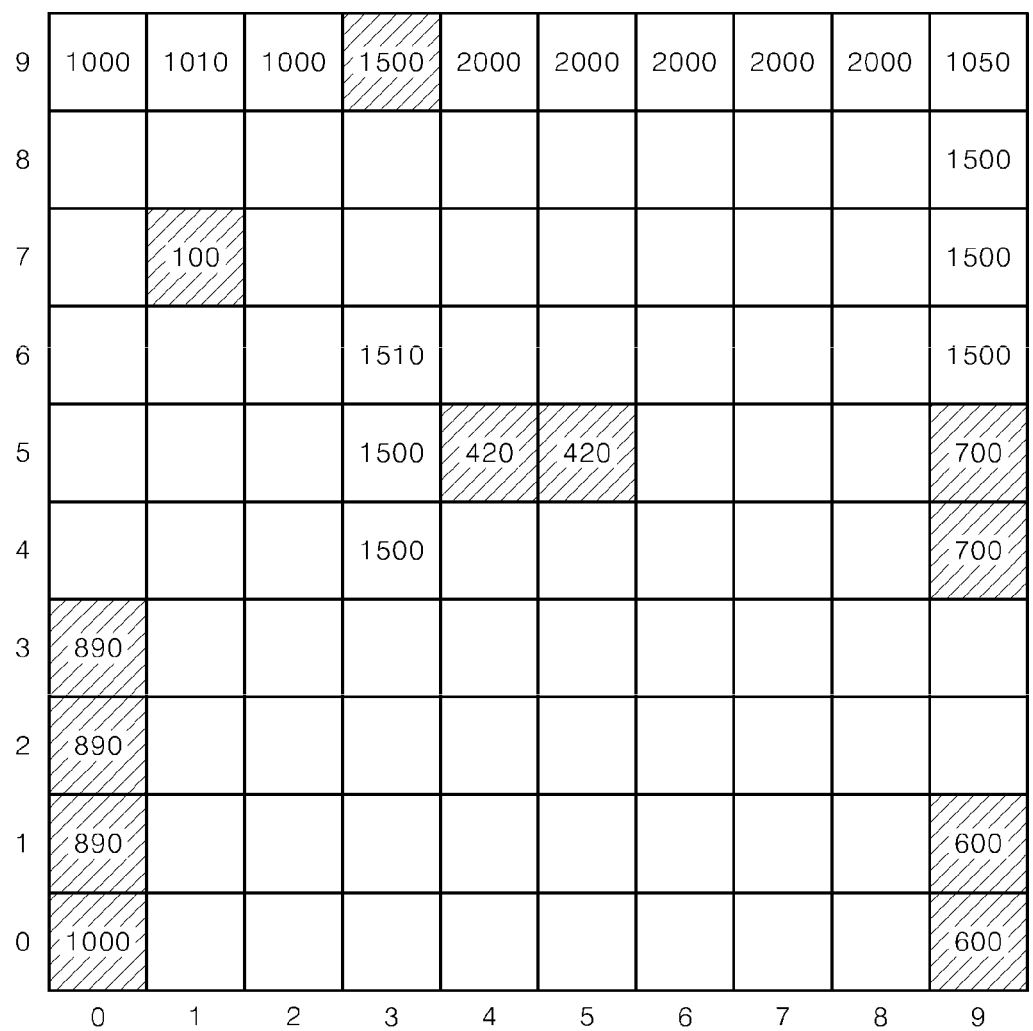
FIG. 9 shows a 3-dimensional map generated by combining information sensed by two types of sensors, according to an embodiment of the present disclosure.

FIG. 9 shows a 3-dimensional map generated by combining information sensed by two types of sensors, according to an embodiment of the present disclosure. FIG. 6 to FIG. 8 show a value detected by each sensor on the map in a global coordinate system. FIG. 6 to FIG. 8 may be temporary maps (lidar sensor maps and depth sensor maps). The objects stored in these temporary maps may be combined with each other and then the combinations may be stored in the map storage 200.

FIG. 9 shows a map generated by the controller 900 combining two types of temporary maps in FIG. 6 and FIG. 7. A shaded cell in FIG. 9 refers to a cell in which sensing results of the two types sensors do not match each other. For each of these cells, an accuracy of a sensed value may increase using a newly sensed value during a subsequent movement of the robot. When the controller combines the temporary maps in FIG. 6 and FIG. 8, the bottom level value may be stored in the 3-dimensional map.

The map in FIG. 9 continues to accumulate over time. Based on the cumulative result, an object that maintains a position without moving may be considered as a stationary object such as walls and doors. To the contrary, based on the cumulative result, when the sensor module no longer senses an object at a specific position, this object may be considered as a moving object that has disappeared in the space. Therefore, the controller 900 compares the accumulated maps with each other or the sensor module detects an object while the robot is moving. In this connection, when an object as previously detected and thus stored on the previous map at a specific position is absent a current map, the controller may remove the object.

In order to identify whether the object has moved most accurately, the controller may use both the lidar sensor 130 and the depth sensor 140 to determine that a specific object has moved or disappeared. Next, one or more of the lidar sensor 130 and the depth sensor 140 identifies that the specific object is missing or has moved. Then, the ultrasound sensor 110 may identify presence or absence of the object within a short distance, thereby to increase the sensing accuracy.

In a SLAM (simultaneous localization and mapping) process, the map information generated by the lidar sensor 130 and the map information sensed by the depth sensor 140 may be combined with each other such that objects that may otherwise not be sensed by a specific sensor may be stored in the map, thereby creating a more accurate map about a space where the robot 1000 moves. In particular, when the two types of sensors are activated and then a map is created via a lidar-depth SLAM, the robot may identify an external object more accurately and create an efficient path to a target point, which disallows collisions.

Further, when one of the sensors of the robot 1000 has a mechanical or electronic failure and thus the sensed data has an error, an aligning process may be performed using the other sensor, thereby to enable obstacle bypass and improve an accuracy of map generation.

In particular, because maps are accumulated over time, a sensor that has failed may be identified by comparing a previously generated map with a recently generated map. Using at least two sensors may accurately sense objects at various heights. Especially, when the depth sensor 140 to sense the height information is combined with the lidar sensor 130 which has a high accuracy but senses an object only at a predetermined position, thereby to generate the 3-dimensional map as shown in FIG. 9, the robot 1000 may avoid collisions with external objects during the movement.

Briefly, the controller 900 combines the position information of the object at the height H as sensed by the lidar sensor 130 with the height and position information of the object as sensed by the depth sensor 140, thereby to create the 3-dimensional map as shown in FIG. 9. Then, the controller may store the created map into the map storage 200. These 3-dimensional maps may be accumulated and stored in the map storage 200 based on the position of the robot or sensor module or over time. That is, a plurality of 3-dimensional maps may be stored in the map storage 200. Thus, previously generated 3-dimensional maps may act as a criterion used for comparing the sensed values from the sensors with each other or identifying a moving state of an object.

More specifically, the controller 900 may combine the temporary map (lidar sensor map) of FIG. 6 that stores the position information of the object at the height H (e.g., 1000 mm) as sensed by the lidar sensor 130 with the temporary map (depth sensor map) of FIG. 7 or FIG. 8 which stores the height and position information of the object as sensed by the depth sensor 140, thereby to create the 3-dimensional map as shown in FIG. 9.

FIG. 10 shows a process of aligning sensing results obtained from two sensors with each other according to one embodiment of the present disclosure. A first map 20 is a previously created map. For convenience of description, all of the height information are assumed to be 1000 mm. The height information may be stored separately.

A second map 21 is generated by the robot 1000 combining positions of objects as sensed by a specific point in time. In the second map 21, the positions of the objects sensed by the depth sensor 140 and the positions of the objects sensed by the lidar sensor 130 may not match each other. This shows a situation where the positions of the objects sensed by the two sensors do not coincide with each other. In this case, comparing the positions of the objects of the first map 20 that are previously sensed with the positions of the objects of the second map 21 may allow a sensor that correctly senses a position of an object to be identified.

In FIG. 10, a map generated by the depth sensor 140 corresponds to the first map 20. Thus, the controller may correct the data based on the depth sensor 140. In FIG. 10, it is shown that the positions of the objects as sensed by the lidar sensor 130 need to be partially corrected in an angular manner. Thus, the positions of the objects as sensed by the lidar sensor 130 may be corrected based on a target calibration amount. In one example, the controller 900 may inform the server of this situation that the data of the two sensors do not match each other, and thus, data of a specific sensor among the two sensors needs to be aligned. This notice may be performed using an alert message. Alternatively, the notice may be displayed on a display attached to the robot 1000 such that the robot replaces or repairs the abnormal sensor.

The process of FIG. 10 is summarized as follows. The depth information of the objects as sensed by the depth sensor 140 may be converted into a physical coordinate system (distance value) which may be used to align the values sensed by the lidar sensor 130. As a result, in addition to the lidar information as sensed by the lidar sensor 130 installed at a specific position on the robot 1000, the depth information of the objects arranged at different heights as detected by the depth sensor 140 may be used.

Further, when both the lidar sensor 130 and depth sensor 140 sense an object, this means that the object is placed at a height at which an object may be sensed by the lidar sensor 130. In addition, the distance value sensed by the lidar sensor 130 and the distance value extracted from the depth information sensed by the depth sensor 140 may be compared with each other. When the two values are different from each other, a difference may be removed based on a normal specific sensor among the two sensors.

In one example, when the object placed outside the robot is a wall, a plane equation of the wall may be calculated using depth information of three points of the wall sensed by the depth sensor 140. When substituting a value (lidar data) sensed by the lidar sensor 130 into the calculated plane equation of the wall, an error and distortion of the data may be identified. This error may be caused by mechanical defects or errors in the lidar data, and calibration of the lidar data may be performed based on a size of the error and distortion.

That is, the controller 900 compares the position information of the object sensed by the lidar sensor 130 and the position information of the object sensed by the depth sensor 140 with each other. When an error occurs as shown in 21 of FIG. 10 based on the comparison result, the controller may apply a sensing result of a normal one of the two sensors to a sensing result of the other or may calibrate the sensing result of the abnormal sensor.

In an embodiment, the controller 900 may calibrate position information according to priorities of the lidar sensor 130 and the depth sensor 140. This means that the position information is calibrated based on a sensing value of a sensor with higher accuracy in a region where the robot 1000 is currently positioned or based on a sensing value selected according to a distance of the detected object. When a sensing value of an object at a long distance from the robot is obtained, a sensing value of the lidar sensor 130 may be given priority. In another example, a sensing value of the depth sensor 140 may be given priority depending on a material or reflection strength of the detected object. The controller 900 may calibrate the sensed position information in consideration of all of a position of the robot, a state of the external light, and a distance of the sensed object.

In another embodiment, the controller 900 may calibrate the position information based on a comparison result between a current 3-dimensional map with a previously stored 3-dimensional map in the map storage 200. The controller may select position information sensed by a sensor which is highly equal to the previously sensed value in the previous 3-dimensional map as shown in FIG. 10 and then perform calibration based on the selected position information. The selected position information may vary depending on a sensing accuracy of a sensor, a position of the robot, and characteristics of surrounding objects. When a change in the position information is not large in a short time interval, the position information may be applied for the calibration. Therefore, in one embodiment, a sensing result of the other sensor may be calibrated based on a sensing result of one sensor whose current sensing value is similar or identical to the previously sensed value thereof.

When, in this process, the controller 900 identifies that a specific sensor is constantly producing an error, the controller 900 may calculate a variable for calibrating position information of objects sensed by the corresponding sensor. For example, in FIG. 10, the controller may calculate a variable (a variable to adjust the Deg1 or Deg2 or Z, etc. as shown in FIG. 4) to calibrate an angular error of the lidar sensor 130. The controller 900 may perform calibration in which the variable is applied to the position information of the object detected by the lidar sensor 130 to identify the position information more accurately. This process may be referred to as a sensor alignment process.

Figure 11:
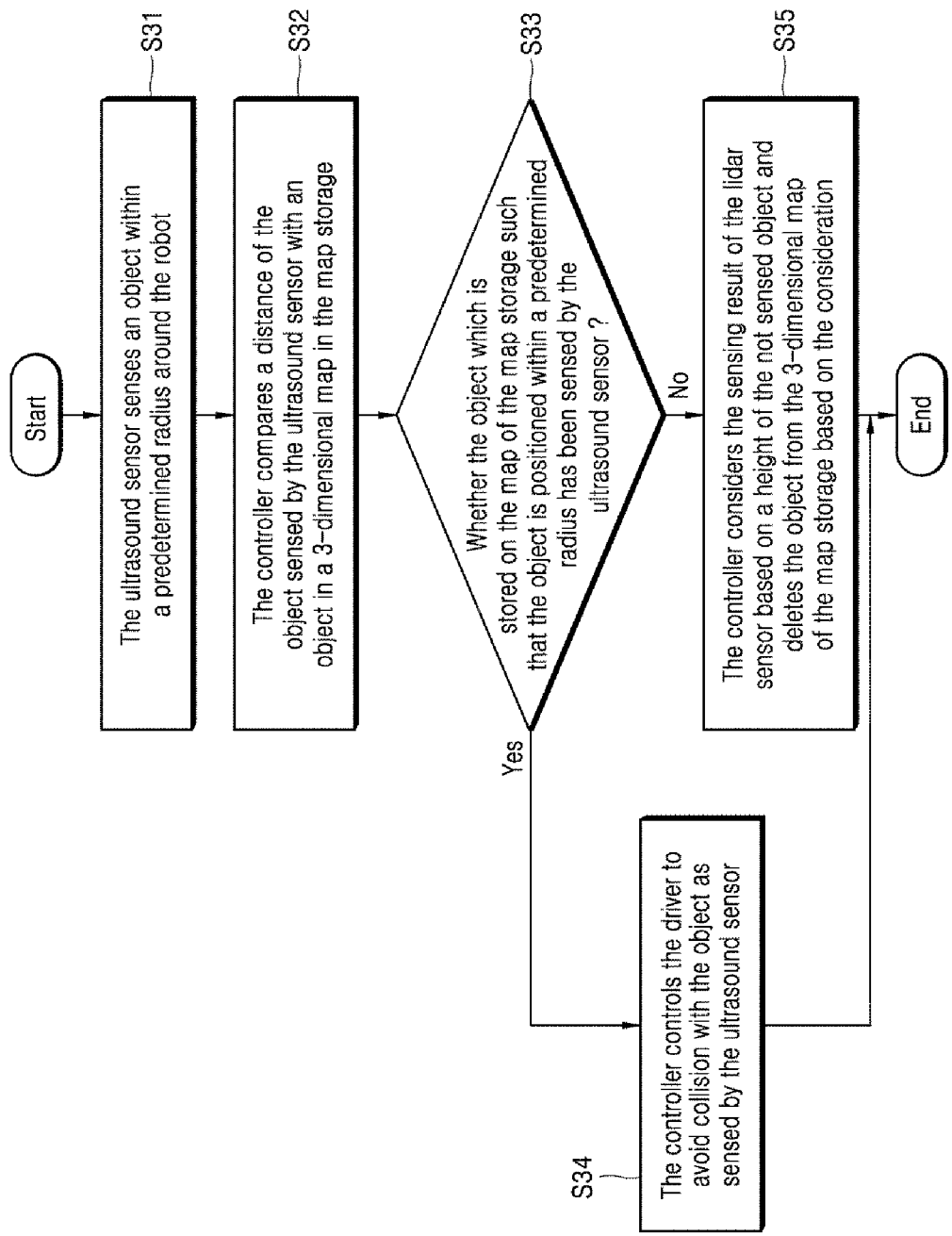
FIG. 11 illustrates a process of sensing an object within a predetermined radius around a robot using an ultrasound sensor and then identifying and removing a moving object among objects stored in a 3-dimensional map of a map storage 200 according to an embodiment of the present disclosure.

FIG. 11 illustrates a process of sensing an object within a predetermined radius around a robot using an ultrasound sensor and then identifying and removing a moving object among objects stored in a 3-dimensional map of a map storage 200 according to an embodiment of the present disclosure.

The ultrasound sensor 110 senses an object within a predetermined radius around the robot 1000 S31. The sensed result may be processed by the sensed-data analyzer 150 of the sensor module 100 and then the processed data may be transmitted to the controller 900. The controller 900 compares a distance of the object sensed by the ultrasound sensor 110 with an object in a 3-dimensional map in the map storage S32. From a result of the comparison, it is identified whether an object present within a predetermined radius of the map in the map storage 200 is sensed by the ultrasound sensor 110.

For example, when the ultrasound sensor 110 senses an object at a 50 cm distance from a robot within a predetermined radius around the robot, for example, within 1 meter, the controller may identify whether there is an object within 50 cm from a current position of the robot in the 3-dimensional map in the map storage 200.

In one example, while the ultrasound sensor 110 senses that there is no object within a predetermined radius (for example, 1 meter) around the robot, the controller identifies whether an object is within a predetermined radius around the robot's current position in the 3-dimensional map of the map storage 200.

When there is an object on the map, and when the object is not detected by the ultrasound sensor 110 even though a height of the object may be sized such that the object is otherwise sensed by the ultrasound sensor 110, the controller 900 identifies the corresponding object as a moving object and removes the same from the map.

Briefly, the controller 900 identifies whether the object which is stored on the map of the map storage 200 such that the object is positioned within a predetermined radius has been sensed by the ultrasound sensor S33. If so, the object is still present in the radius. Thus, the controller 900 may control the driver 300 to avoid collision with the object as sensed by the ultrasound sensor 110 S34.

To the contrary, when the object is not sensed, the controller 900 may consider the sensing result of the lidar sensor 130 based on a height of the not sensed object and may delete the object from the 3-dimensional map of the map storage 200 based on the consideration S35. In particular, a region that the depth sensor 140 may not sense may be present. For example, when the depth sensor 140 senses a region in front of the robot, the depth sensor 140 may not sense an object in a region behind the robot 1000. Thus, the controller may use the ultrasound sensor 110 to identify whether the not sensed object is a moving object S35.

Figure 12:
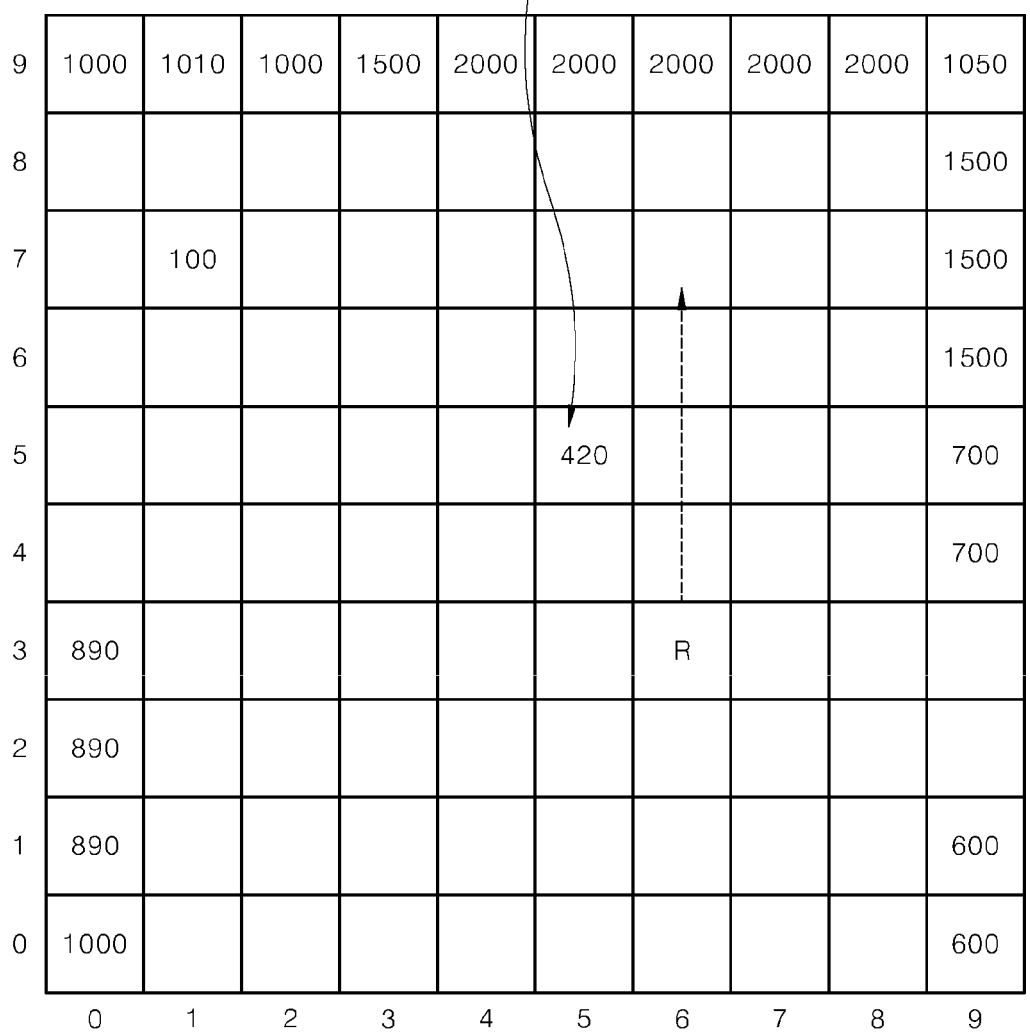
FIG. 12 shows a process of removing a moving object by a robot while the robot is moving according to an embodiment of the present disclosure.

FIG. 12 shows a process of removing a moving object by a robot while the robot is moving according to an embodiment of the present disclosure. In the map of FIG. 12, a robot's position is marked as "R", and the robot moves from a cell (6, 4) to a cell (6, 6). When the robot is present at a cell (6, 3), an object 50 is sensed by the depth sensor 140. Because a height of the object 50 is 420 mm, the object 50 is not sensed by the lidar sensor 130.

Then, while the robot moves, the depth sensor 140 continuously senses a depth of each of objects in front of the robot. When the object 50 moves and disappears while the robot is positioned at the cell (6, 4), the corresponding object 50 is not sensed by the depth sensor 140. Similarly, the ultrasound sensor 110 may not sense the object 50 at an adjacent position thereto. Thus, the object 50 may be removed from the 3-dimensional map.

To the contrary, the depth sensor 140 may not sense the object 50 when the robot has moves to the cell (6, 6). In other words, although the object 50 is placed, the depth sensor 140 is present in front of the object 50. Thus, the object 50 may not be sensed. In order to sense the object 50, the robot may rotate. However, this rotation causes a speed of the robot to slow down.

Therefore, as shown in FIG. 12, after the robot passes by the object 50, the controller may use the ultrasonic sensor 110 to identify whether the object 50 adjacent to the robot and in rear of the robot is detected. When the object 50 is sensed, the object 50 is stored in the 3-dimensional map. To the contrary, when the object 50 is not sensed by the ultrasound sensor 110, the object 50 is identified as a moving object and thus the object 50 is removed from the 3-dimensional map.

Briefly, the ultrasound sensor 110 senses whether an object exists within a predetermined radius around the robot. When the object is not detected by the ultrasound sensor 110 but the object is identified as being present on the 3-dimensional map, the controller 900 identifies that the object stored on the map is a moving object and removes the moving object from the 3-dimensional map.

Figure 13:
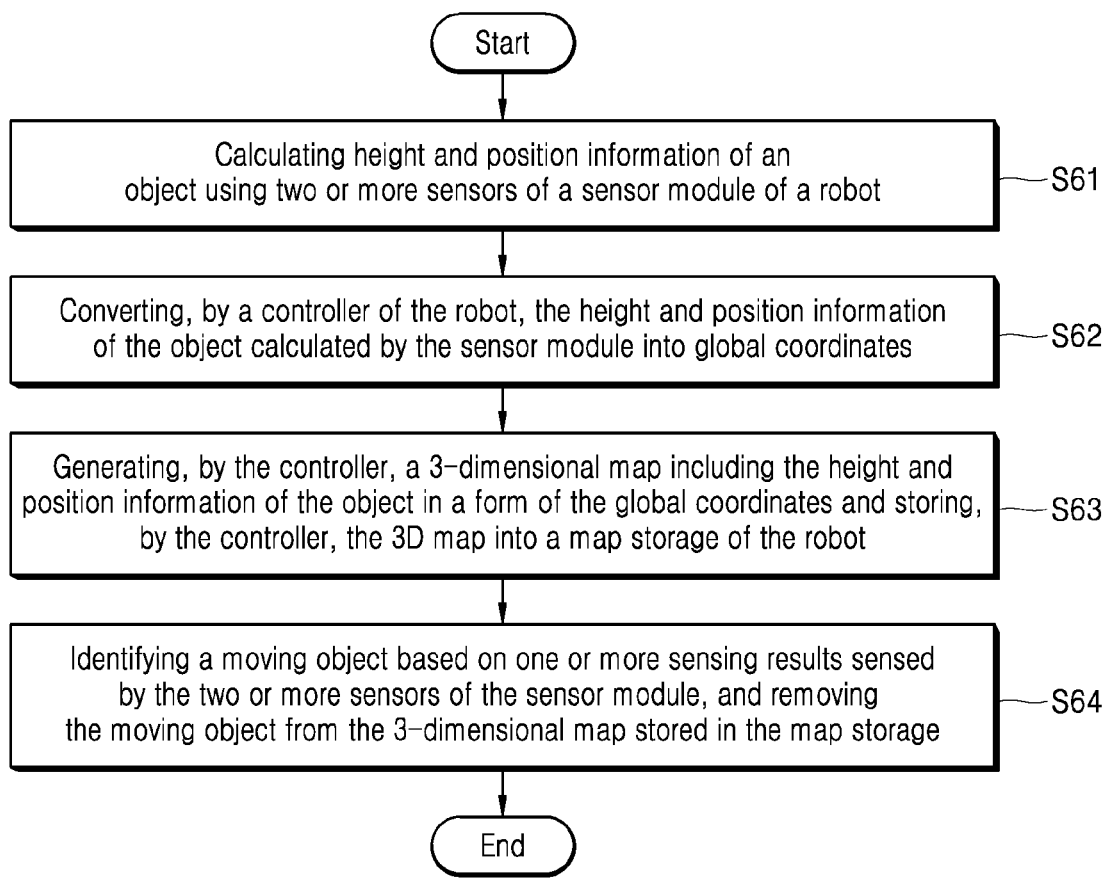
FIG. 13 shows a process in which a robot identifies a moving object in a 3-dimensional space according to an embodiment of the present disclosure.

FIG. 13 shows a process in which a robot identifies a moving object in a 3-dimensional space according to an embodiment of the present disclosure.

The sensor module 100 of the robot 1000 calculates height and position information of an object using two or more sensors S61. In this connection, the two or more sensors may include the lidar sensor 130 coupled to a robot to calculate a physical distance between the object and the robot and angle information between the object and the robot, the depth sensor 140 for calculating depth information of the object in one direction from the robot, and the ultrasound sensor 110 for sensing a distance of the object within a predetermined radius around the robot. The sensor module 100 calculates height and position information of the object using two or more sensors among the sensors 130, 140 and 110.

The controller 900 of the robot 1000 converts the height and position information of the object as calculated by the sensor module into a global coordinates system S62. The controller 900 generates a 3-dimensional map including the height and position information of the object converted into the global coordinates system and stores the map in the robot's map storage S63. The process of creating the 3-dimensional map has been described above with reference to FIG. 3 to FIG. 9.

In more detail, the lidar sensor 130 may generate a two-dimensional lidar sensor map as an example of a temporary map. The depth sensor 140 may create a three-dimensional depth sensor map as an example of a temporary map. The controller 900 combines the former and latter with each other to create a 3-dimensional map. The map storage 200 stores the 3-dimensional map generated by the controller combining the aforementioned 2-dimension lidar sensor map and the 3D depth sensor map with each other.

Then, the controller 900 identifies a moving object based on one or more sensing results as sensed by the two or more sensors of the sensor module 100 and then removes the moving object from the 3-dimensional map stored in the map storage 200 S64. With reference to FIG. 11 and FIG. 12, how to remove the moving object from the map has been described above.

In an embodiment of the present disclosure, the controller 900 stores, in a 3-dimensional map, at least one of a first object commonly sensed in the at least two sensor maps (lidar sensor map and depth sensor map), a second object sensed by the depth sensor 140 and placed at a height at which the lidar sensor 130 may not sense an object, and a third object not sensed by the depth sensor 140 but sensed by the lidar sensor 130. The controller 900 identifies an object that is not sensed within the predefined radius among the objects stored in the 3-dimensional map as an moving object and removes the moving object from the 3-dimensional map.

The predefined radius is an example of an range in which the ultrasound sensor 110 may accurately sense an object. Alternatively, a radius used for determining whether the object has moved in the 3-dimensional map may be defined as the predetermined radius. For example, when the controller 900 is configured to determine whether an object only within 2 meters from the robot moves in the 3-dimensional map while the robot is moving, the ultrasound sensor 110 may sense an object within 2 meters therefrom. Further, the sensing results of the lidar sensor 130 and depth sensor 140 may be combined with each other to increase the accuracy of the sensing results.

Further, when the above-described second object and third object are positioned adjacent to each other within a predefined spacing, for example, when, as shown in FIG. 10, the above-described second object and third object are positioned adjacent to each other such that detected lines thereof intersect with each other, the controller 900 may compare the position of the second or third object with the 3-dimensional map previously stored in the map storage 200 and may calibrate the position information of the second or third object based on the comparison result.

In an environment where objects of varying heights are placed, the robot may use the combinations of the sensors to identify when the robot may pass through the objects. In one embodiment, one of the sensors is applied to an obstacle protruding from the wall and thus determines that the robot may pass through the obstacle, while the other of the sensors is applied to the obstacle protruding from the wall and thus determines that the robot may not pass through the obstacle.

In order for the robot to pass through a predetermined space, the robot should determine whether a height of a bottom obstacle placed on a floor corresponds to a height at which the robot may pass through an obstacle. Further, when there is a protruding obstacle in front of the robot, rather than a flat and planar obstacle like a wall, the robot may determine whether the robot may pass through the obstacle based on a space occupied by this obstacle at a predetermined height Therefore, the robot may perform a predefined service (cleaning, guidance, security, search), etc., or operate to avoid the obstacle, depending on a position of the protruding obstacle (protrusion). In order for the robot to operate based on information about the external obstacle, it is necessary to construct the 3-dimensional map as described in accordance with the present disclosure, so that the robot senses the external obstacle in a three dimension manner. In other words, the robot may implement the 3D map using various kinds of the sensors.

In particular, a height of the robot that plays a role of cleaning, guiding, security screening in a space having a large population such as an airport, terminal, hospital, hotel, school, etc. must be larger than a predetermined size. In this case, the robot may sense an entire space in a three dimensions manner and create the 3-dimensional map based on the sensing result and move based on the 3-dimensional map. In this process, the robot senses the moving object and deletes the moving object from the map to prevent unnecessary information from being stored in the map.

Various sensors may sense objects based on characteristics of the sensors. The lidar sensor 130 may sense objects in a wide range and at a long distance. The depth sensor 140 may sense heights of the objects in an advancing direction. Further, the ultrasound sensor 110 may identify whether the object stored on the map is adjacent to the robot so that the controller 900 may identify whether the object should be removed from the map.

Figure 14:
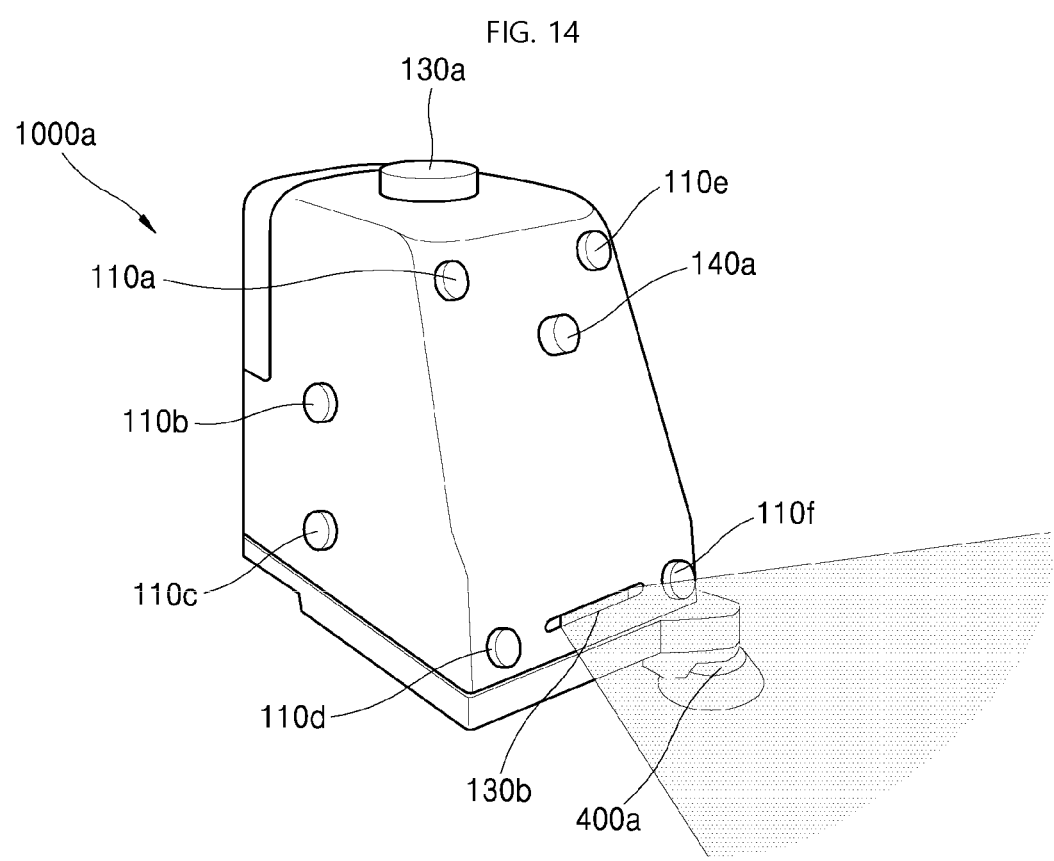
FIG. 14 illustrates a configuration in which various sensors are arranged in a robot according to an embodiment of the present disclosure.

FIG. 14 illustrates a configuration in which various sensors are arranged in a robot according to an embodiment of the present disclosure. Ultrasound sensors 110*a* to 110*f*, a lidar sensor 130*a*, and a depth sensor 140*a* are positioned on a front or side or rear face of the robot 1000*a*. According to an embodiment, one or more sensors of various types may be arranged thereon. An infrared sensor may be disposed in a portion of a region where the ultrasound sensor is disposed to identify the objects in a direction in which the robot travels. The ultrasonic sensors 110*a* to 110*f* are arranged at different heights respectively to effectively sense objects placed in various heights.

The lidar sensor 130*a* may create an entirety of the map. The depth sensor 140*a* calculates depth information of an object disposed in front of the robot. The ultrasound sensors 110*a* to 110*f* may sense an object in a blind spot that the depth sensor 140*a* may not detect to whether an object stored on the map has moved.

The service-providing device 400*a* may be disposed on the robot. In FIG. 14, the service-providing device 400*a* has a cleaning component that may be a brush, mop, or dust suction means. When the service-providing device 400*a* performs a security service, a component that performs bomb detection may be included therein. The driver 300 is located at a bottom portion of the robot and is not shown in FIG. 14.

An additional lidar sensor 130*b* may be placed on the robot 1000*a* for further increasing the sensing accuracy.

In accordance with the present disclosure, the controller may register an object as a feature on SLAM, and the object is placed at a height other than a height where the lidar sensor 130 is installed on the SLAM. That is, the position and height information of objects of various heights may be stored in a 3-dimensional map. In particular, the robot selects a movement route based on a initially generated map, and selects an area in which the service is performed, based on the initially generated map. Unlike the present disclosure, using only the lidar sensor 130 may cause an object at a height other than a corresponding height not to be sensed, and thus the object may be a risky factor against the robot movement, thereby to reduce performance of the service. To the contrary, in accordance with the present disclosure, when features of objects detected by the lidar sensor 130 and depth sensor 140 are added to the map during the SLAM process, the robot may create a map that reflects all the objects in the whole space. Then, the robot's movement path may be generated more efficiently based on the accuracy-improved map.

In particular, in addition to a top of the robot, a lidar sensor (for example, 130*b* in FIG. 14) may be disposed at the bottom of the robot. Thus, the accuracy of sensing may be improved by combining the two-dimensional maps at two heights as calculated by the two lidar sensors 130 with each other.

In this case, the lidar sensor 130*a* at the top may be configured to have a wide sensing angle, while the lidar sensor 130*b* at the bottom may be configured to have a narrow sensing angle.

In accordance with the present disclosure, when the depth sensor 140 is affected by light, the controller may impose a priority to the sensed data from the lidar sensor 130 to sense the external objects accurately. Further, the lidar sensor 130 senses the object at a specific height. In this connection, the sensing result from the lidar sensor 130 may be complemented by the sensing result from the depth sensor 140 which may sense objects at various heights, thereby allowing the robot to create the more accurate 3-dimensional map.

In another exemplary embodiment, each of the temporary maps in which positions of objects sensed by each sensor are stored, that is, each of the lidar sensor map and depth sensor map may be used to compensate for the determination of the moving object based on the sensing result of the ultrasound sensor 110 or to more precisely sense the moving object.

Figure 15:
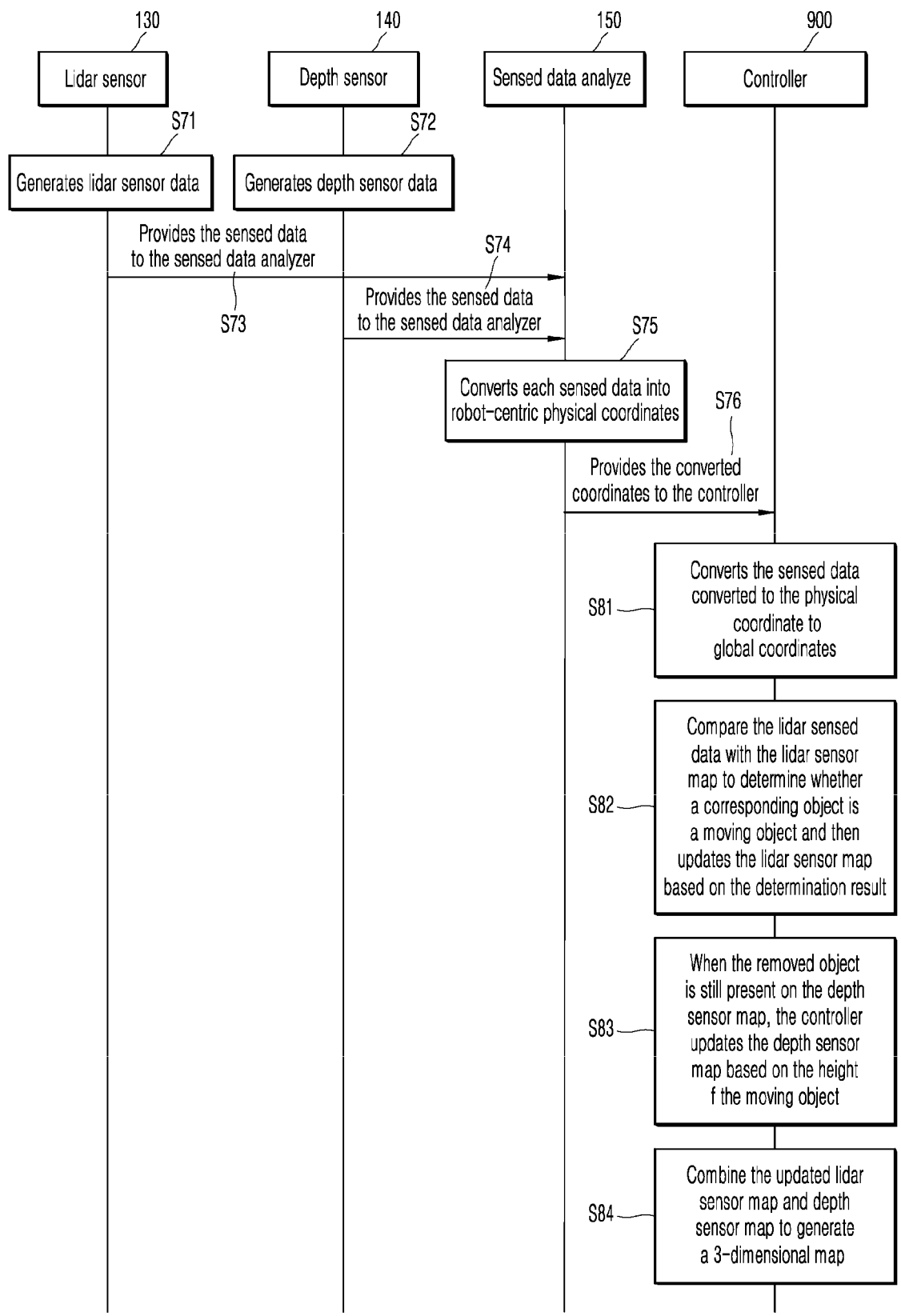
FIG. 15 illustrates a process of comparing positions of objects sensed by various sensors with each other and identifying a moving object based on the comparison according to an embodiment of the present disclosure.

FIG. 15 illustrates a process of comparing positions of objects sensed by various sensors with each other and identifying a moving object based on the comparison according to an embodiment of the present disclosure.

The lidar sensor 130 generates lidar sensor data about an external object S71. Similarly, the depth sensor 140 also generates depth sensor data about the external object S72. Each of these sensors provides the sensed data to the sensed data analyzer S73 and S74.

The sensed-data analyzer 150 converts each sensed data into robot-centric physical coordinates and provides the same to the controller S75 and S76. When converting the data to the physical coordinates, the sensed-data analyzer 150 informs a sensor associated with the converted physical coordinates to the controller 900. Thus, the controller 900 converts the sensed data converted to the physical coordinate to global coordinates S81. When converting the physical coordinates to the global coordinates, the controller may compare the currently sensed data with each of the previous lidar sensor map and depth sensor map. Further, the controller 900 may compare the currently sensed data with a previous 3-dimensional map generated by combining the previous lidar and depth sensor maps with each other.

In an embodiment, the controller may compare the lidar sensor data with the lidar sensor map to determine whether a corresponding object is a moving object and then may update the lidar sensor map based on the determination result S82. In one example, in this process, a moving object is not sensed by the lidar sensor 130 and thus is removed from the map. However, the removed object may be still present on the depth sensor map. In this case, the robot may update the depth sensor map based on the height of the moving object S83. Thus, when the moving object is out of a direction angle of the depth sensor 140 or an object detectable range of the depth sensor 140, the depth sensor 140 may maintain the position of the object without updating the depth sensor map even after the moving object has moved. Therefore, to solve this problem, when it is determined that an object does not exist in a specific global coordinate based on a sensing result from the lidar sensor 130, and when a height of the moving object corresponds to a height at which the lidar sensor 130 may sense an object, the controller may remove the object from the depth sensor map. However, when a height of the moving object does not correspond to a height at which the lidar sensor 130 may sense an object, the controller may not remove the object from the depth sensor map but keep the same in the depth sensor map.

The controller 900 may combine the updated lidar sensor map and depth sensor map to generate a 3-dimensional map S84.

More specifically, the physical coordinates of the objects sensed by the lidar sensor 130 may be converted, by the controller 900, to the global coordinates to continuously generate the lidar sensor map. Similarly, the physical coordinates of the objects sensed by the depth sensor 140 may be converted, by the controller 900, to the global coordinates to continuously generate the depth sensor map.

In this process, an object determined to be removed from the lidar sensor map because the object is not sensed by the lidar sensor 130 may be identified by the controller. More precisely, in one embodiment, the lidar sensor 130 no longer senses an object in a specific global coordinate in which it was previously identified that a specific object was present. In this case, the controller 900 identifies whether there is an object sensed by the depth sensor 140 with reference to the specific global coordinate.

When there is an object sensed by the depth sensor 140 in a region corresponding to the specific global coordinate, more precisely, when the object is identified to have a height at which the lidar sensor 130 may not sense an object, the controller may not remove the corresponding object from the depth sensor map but keep the same therein. As a result, an object which is not sensed by the lidar sensor and thus is determined to be a moving object may be removed from the lidar sensor map, However, when the object is identified in the depth sensor map, the object is maintained in the depth sensor map. Later, the object may be stored in the 3-dimensional map in a distinguished manner such that the object was sensed by the depth sensor 140.

In one example, the depth sensor 140 may have a narrower field of view (FOV) than a FOV of the lidar sensor 130. A distance in which the object may be detected by the depth sensor 140 may be smaller than that by the lidar sensor 130. Therefore, there may be an object that the depth sensor 140 may not sense in a region outside a FOV of the depth sensor 140. To compensate for this error, when a specific object is not sensed by the lidar sensor 130, and is not sensed by the depth sensor 140, the ultrasound sensor 110 may be used to identify whether the specific object has moved.

In accordance with an embodiment of the present disclosure, an object may be sensed even in a region that the robot's depth sensor 140 may not detect due to the position and FOV of the depth sensor 140 installed on the robot 1000. In particular, in order that the depth sensor 140 may detect an object at a low height near a floor (for example, an obstacle at a 5 cm height from a bottom) in a large space having a large population, the object should be within 2 m in front of the robot. However, when the object moves out of the range of 2 m, the depth sensor 140 may not identify that the object has moved. Thus, the object may not be removed from the depth sensor map.

When the controller does not remove the moving object from the depth sensor map in real time, incorrect data may indicate that the moving object is still present on a 3-dimensional map generated by combining the lidar sensor map and the depth sensor map. This narrows a range in which the robot may move or a moveable path of a robot, and prevents the robot from moving efficiently. Therefore, when the moving object is removed continuously from the depth sensor map as shown in FIG. 15, this may enlarge a range in which the robot may move or a moveable path of a robot, and allow the robot to move efficiently. That is, according to the present disclosure, the controller may reflect that an object has moved and disappeared in a region by which the robot has passed, that is, a region where the depth sensor 140 may not sense an object, thereby to generate an accurate map.

Figure 17:
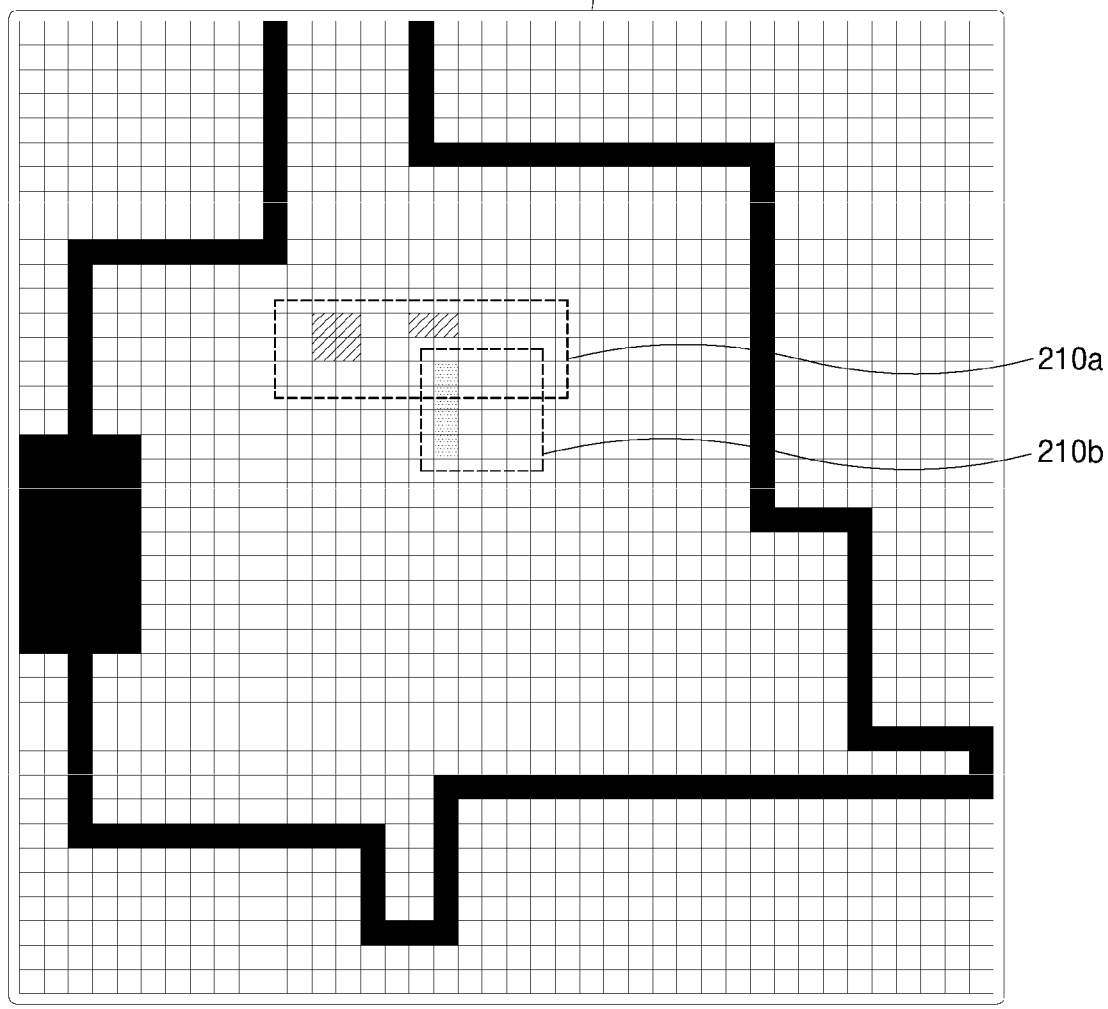

FIG. 16 and FIG. 17 show a lidar sensor map, a depth sensor map, and a 3-dimensional map according to one embodiment of the present disclosure.

The lidar sensor 130 senses objects at predefined heights. Then, the sensed-data analyzer 150 provides the physical coordinates to the controller 900. Then, the controller 900 generates a lidar sensor map 201 based on the physical coordinates. The lidar sensor map 201 reflects the global coordinates. In one example, a range in which the depth sensor 140 may sense an object while the sensor 140 is located at the robot is equal to a range 201a. The controller 900 may reflect the global coordinates of the objects sensed by the depth sensor 140 in this region 201a to generate the depth sensor map 202.

Referring to the two sensor maps 201 and 202 in FIG. 16, there are regions 201b and 202a in which objects are sensed by both the sensors and the sensing results are stored in a form of global coordinates, and a region 202b in which objects are sensed by only one of the sensors and the sensing result is stored in a form of global coordinates.

Combining these two maps 201 and 202 may compose a 3-dimensional map 210 as shown in FIG. 17. The 3-dimensional map 210 may be divided into a region 210a sensed by both the lidar sensor 130 and depth sensor 140, a region 210b sensed only by the depth sensor 140, and regions sensed by the lidar sensor (black regions in FIG. 16 and FIG. 17). This allows the robot to display the regions in different colors or in different forms.

Figure 18:
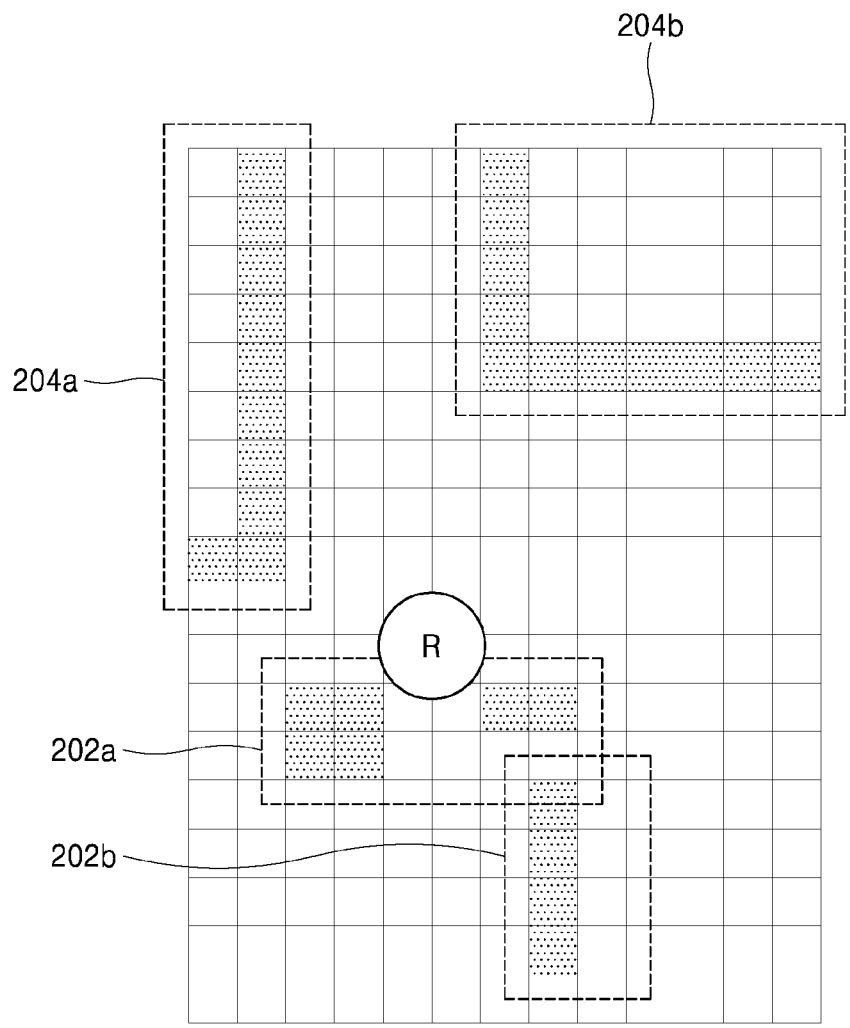
FIG. 18 shows a depth sensor map created subsequently to FIG. 16.

In one example, all of the coordinates shown in the 3-dimensional map in FIG. 17 correspond to positions where the objects are placed. There may be a moving object among the objects. Therefore, a depth sensor map created after the robot moves in an direction of an arrow from a position of R in the depth sensor map 202 of FIG. 16 is shown in FIG. 18. The map in FIG. 17 may be a temporary map. In other words, the temporary map may be created and maintained temporarily and then may be stored as a fixed map at a predefined time point.

FIG. 18 shows a depth sensor map created subsequently to FIG. 16. A depth sensor map 204 presents regions 204*a* and 204*b* that indicate positions of new objects sensed while the robot R advances. To the contrary, the depth sensor 140 may not detect regions 202*a* and 202*b* located in rear of the robot.

Thus, the process in FIG. 15 may be applied. In this connection, when the lidar sensor 130 senses an object in the regions 202*a* and 202*b*, the controller may keep the object in the lidar sensor map because the object has not moved. In one example, an object at a height (the region 202*b* in FIG. 18 corresponding to the region 202*b* in FIGS. 16 and 210*b* in FIG. 17) at which the lidar sensor 130 may not sense an object. Further, when the ultrasound sensor 110 does not sense the object in the region 202*b*, the object may be removed from the depth sensor map 204.

In summary, the controller 900 of the robot having both the depth sensor 140 and the lidar sensor 130 creates temporary maps (lidar sensor map and depth sensor map) that store positions of objects detected by the sensors. In the depth sensor map, coordinates of the objects within a distance and a field of view (FOV) corresponding to a sensing ability of the depth sensor 140 may be updated and stored on a predefined period basis (as determined based on a specification of the depth sensor) in real time. To the contrary, information about the object out of the FOV and distance may be converted to the global coordinates of the robot which in turn may be stored on the 3-dimensional map.

In this process, the moving object is identified using the lidar sensor 130 so that the moving object is not stored in the 3-dimensional map, that is, is removed from the 3-dimensional map. For example, the controller may update the lidar sensor map in real time such that coordinates of the objects within a distance and a field of view (FOV) corresponding to a sensing ability of the depth sensor 140 may be updated and stored on a predefined period basis in real time. Then, the controller may convert the updated coordinates of the objects into the global coordinates system as a robot coordinate system. At the same time, the lidar sensor map in which the moving object is removed may be updated. In this process, the depth sensor map may be compared with the lidar sensor map to remove the moving object based on the comparison result. That is, the global coordinate of the position where the object no longer exists in the process of updating the lidar sensor map may be compared with the depth sensor map. Then, the lidar sensor map may be updated based on the comparison result.

For example, when a coordinate of an object removed from the lidar sensor map corresponds to a position where the lidar sensor 130 may not sense an object actually, that is, when the object of the coordinate is not detected at a position where the lidar sensor 130 is installed, the object of the coordinate may not be deleted from the depth sensor map. To the contrary, when an object at a height at which the lidar sensor 130 may detect an object is no longer sensed, the object may be deleted from the depth sensor map. To increase the sensing accuracy, the ultrasound sensor 110 or the infrared sensor 120 may be used to identify whether an object in a region that the depth sensor 140 may not detect in the depth sensor map has moved.

Figure 19:
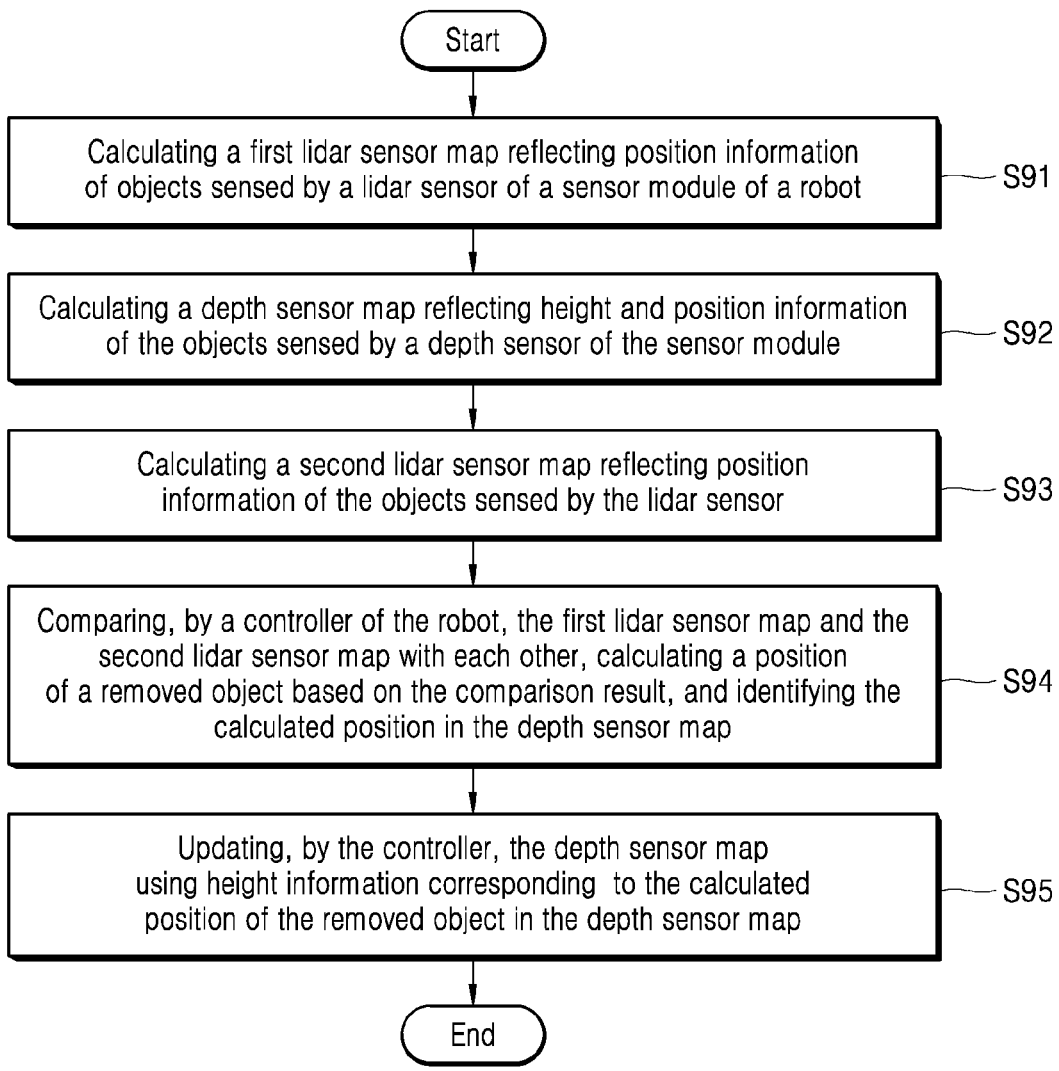
FIG. 19 illustrates a process of identifying a moving object in a dimensional space according to an embodiment of the present disclosure.

FIG. 19 illustrates a process of identifying a moving object in a dimensional space according to an embodiment of the present disclosure. A first lidar sensor map reflecting position information of the objects sensed by the lidar sensor 130 may be calculated S91. A depth sensor map reflecting height and position information of the objects sensed by the depth sensor may be calculated S92. This is illustrated in FIG. 16. A second lidar sensor map reflecting position information of the objects sensed by the lidar sensor 130 may be then calculated S93. As a result, a moving object, that is, a missing object does not exist in the second lidar sensor map.

Therefore, the controller 900 compares the first lidar sensor map and the second lidar sensor map with each other and calculates a position of the removed object based on the comparison result, and then identifies the calculated position in the depth sensor map S94. When the object is identified as being removed from the depth sensor map, this indicates changes in the two sensors. Thus, the controller may remove the object from the depth sensor map. To the contrary, when there is a mismatch therebetween, for example, when the position of the removed object corresponds a position at which the depth sensor 140 may not detect an object, the controller may determine whether to remove the object based on a height.

That is, the controller 900 updates the depth sensor map using height information corresponding to the position of the object removed from the depth sensor map S95. For example, when the controller 900 may maintain the position of the object in the depth sensor map when the height information does not correspond to a height at which the lidar sensor 130 may sense an object. Otherwise, when one of other sensors, for example, the ultrasound sensor 110 or infrared sensor 120 does not sense the object still, the controller 900 may be configured to remove the position of the object from the depth sensor map, thereby to construct the map to be free of an obstacle.

Although the present disclosure has been described based on a robot equipped with a cleaning service as an example of the robot, the present disclosure is not limited thereto. The present disclosure may be applicable to all autonomous robot products. In particular, the robot in accordance with the present disclosure may identify the moving object using the combinations of the various sensors and store the positions of the objects in the 3-dimensional map.

Although all components constituting an embodiment of the present disclosure are described as being combined into a single component or operating in a combined manner thereto, the present disclosure is not necessarily limited to this embodiment. Within the scope of the present disclosure, all components may be selectively combined into at least two components or operate in a combined manner thereto. Further, each of all of the components may be implemented in a single independent hardware. In another example, some or all of the components may be selectively combined to be implemented as a computer program having a program module that performs some or all of functions combined in one or a plurality of hardware. Codes and code segments constituting the computer program may be easily derived by those skilled in the art of the present disclosure. Such a computer program may be stored in a computer readable storage medium and may be read and executed by a computer, thereby to implement an embodiment of the present disclosure. The storage medium of the computer program includes a storage medium including a magnetic recording medium, an optical recording medium and a semiconductor recording element. Further, the computer program for implementing an embodiment of the present disclosure includes a program module transmitted in real time through an external device.

In the above description, the present disclosure has been described with reference to embodiments of the present disclosure. However, various changes and modifications may be made at a level of a knowledge of a skilled person to the art. Thus, it will be understood that such changes and modifications are included within the scope of the present disclosure unless they depart from the scope of the present disclosure.

REFERENCE NUMERALS

| | |
|---|---|
| 1000: Robot | 100: Sensing module |
| 110: Ultrasonic sensor | 120: Infrared sensor |
| 130: Lidar sensor | 140: Depth sensor |
| 150: Sensed data analyzer | 200: Map storage |
| 300: Driver | 400: Service-providing device |
| 500: Communicator | 900: Controller |

What is claimed is:

1. A robot, comprising:
a sensor module configured to calculate height and position information of one or more objects using two or more sensors of the sensor module,
a driver configured to move the robot;
a map storage for storing a 3-dimensional map including the height and position information of the one or more objects calculated by the sensor module in a space in which the robot moves; and
a controller configured to:
control the sensor module, the driver, and the map storage,
convert the height and position information of the one or more objects calculated by the sensor module into global coordinates, and
store the height and position information of the one or more objects into the 3-dimensional map using the global coordinates, wherein the two or more sensors include a lidar sensor and a depth sensor,
wherein the two or more sensors includes an ultrasound sensor configured to sense a distance of the one or more objects within a predetermined radius around the robot,
wherein the lidar sensor is configured to calculate a physical distance between the one or more objects and the robot and angle information between the one or more objects and the robot,
wherein the depth sensor is configured to calculate depth information of the one or more objects in one direction from the robot,
wherein the sensor module is configured to calculate height and position information of the one or more objects using at least two sensors selected from the lidar sensor, the depth sensor, and the ultrasound sensors,
wherein the 3-dimensional map is generated by combining a 2-dimensional lidar sensor map generated by the lidar sensor and a 3-dimensional depth sensor map generated by the depth sensor with each other,
wherein the controller is further configured to:
store at least one of a first object, a second object, or a third object of the one or more objects in the 3-dimensional map, wherein the first object is commonly sensed by the at least two sensors, wherein the second object is placed at a height at which the second object is not sensed by the lidar sensor, and the second object is sensed by the depth sensor, wherein the third object is not sensed by the depth sensor, and the third object is sensed by the lidar sensor, and
when one of the first object, the second object, or the third object stored in the 3-dimensional map is not sensed by the ultrasound sensor:
identify the one of the first object, the second object, or the third object as a moving object, and
remove the moving object from the 3-dimensional map.

2. The robot of claim 1, wherein the controller is configured to combine the position information of the one object sensed by the lidar having a predetermined height with the height and position information of the one object sensed by the depth sensor to generate the 3-dimensional map and store the 3-dimensional map into the map storage,
wherein the map storage stores a plurality of 3-dimensional maps based on positions of the sensor module over time, and
wherein the controller is further configured to:
select a moving object among the one or more objects stored in the map storage based on a sensing result of at least one of the lidar sensor or the depth sensor, and
remove the moving object from the 3-dimensional map.

3. The robot of claim 1, wherein the controller is further configured to compare the position information of the one object sensed by the lidar sensor with the position information of the one object sensed by the depth sensor to obtain a comparison result, and
wherein the controller is further configured to, when an error occurs based on the comparison result:
calibrate the position information based on priorities of the lidar sensor and the depth sensor, or
calibrate the position information based on a comparison result between a current 3-dimensional map and a previously stored 3-dimensional map in the map storage.

4. The robot of claim 3, wherein the controller is further configured to:
determine one of the lidar sensor and the depth sensor as causing the error based on the comparison result;
calculate a variable for calibrating a sensing result of the determined one of the lidar sensor and the depth sensor, and
apply the variable to the position information of the one object sensed by the determined one of the lidar sensor and the depth sensor to perform calibration thereof.

5. The robot of claim 3, wherein the controller is further configured to register object information by prioritizing between a sensing result of the depth sensor when the one object is within a first distance and a sensing result of the lidar sensor when the one object is beyond the first distance.

6. The robot of claim 1,
wherein the controller is further configured to, when a previously stored object in the 3-dimensional map is not sensed within a predefined radius around the robot by the ultrasound sensor:
identify the previously stored object as a moving object, and
remove the moving object from the 3-dimensional map.

7. The robot of claim 6,
wherein the ultrasound sensor is configured to identify another object in a region in which the depth sensor does not sense any object.

8. The robot of claim 1, wherein the controller is further configured to, when the second object and the third object are positioned adjacent to each other within a predefined spacing:
compare a position of the second object or the third object with a previously stored 3-dimensional map in the map storage to provide a comparison result, and
calibrate the position information of the second object or the third object based on the comparison result.

9. A method of identifying a moving object in a 3-dimensional space, the method comprising:
calculating height information and position information of one or more objects using two or more sensors of a sensor module of a robot;
converting, by a controller of the robot, the height information and the position information of the one or more objects calculated by the sensor module into global coordinates;
generating, by the controller, a 3-dimensional map including the height information and the position information of the of the one of more objects using the global coordinates;
storing, by the controller, the 3-dimensional map into a map storage of the robot;
identifying a moving object among the one or more objects based on one or more sensing results sensed by the two or more sensors of the sensor module; and
removing the moving object from the 3-dimensional map stored in the map storage,
wherein the two or more sensors includes a lidar sensor and a depth sensor,
wherein the two or more sensors includes an ultrasound sensor configured to sense a distance of the one or more objects within a predetermined radius around the robot,
wherein the lidar sensor is configured to calculate a physical distance between the one or more objects and the robot and angle information between the one or more objects and the robot,
wherein the depth sensor is configured to calculate depth information of the one or more objects in one direction from the robot,
wherein the sensor module is configured to calculate height and position information of the one or more objects using at least two sensors selected from the lidar sensor, the depth sensor, and the ultrasound sensors,
wherein the 3-dimensional map is generated by combining a 2-dimensional lidar sensor map generated by the lidar sensor and a 3-dimensional depth sensor map generated by the depth sensor with each other,
wherein the controller is further configured to:
store at least one of a first object, a second object, or a third object of the one or more objects in the 3-dimensional map, wherein the first object is commonly sensed by the at least two sensors, wherein the second object is placed at a height at which the second object is not sensed by the lidar sensor, and the second object is sensed by the depth sensor, wherein the third object is not sensed by the depth sensor, and the third object is sensed by the lidar sensor, and when one of the first object, the second object, or the third object stored in the 3-dimensional map is not sensed by the ultrasound sensor:
identify the one of the first object, the second object, or the third object as a moving object, and
remove the moving object from the 3-dimensional map.

10. The method of claim 9,
wherein the generating and storing of the 3-dimensional map includes combining the position information of the one object sensed by the lidar sensor having a predetermined height with the height information and the position information of the one object sensed by the depth sensor to generate the 3-dimensional map and to store the 3-dimensional map into the map storage.

11. The method of claim 10, wherein the map storage stores therein a plurality of 3-dimensional maps based on positions of the sensor module over time.

12. The method of claim 10, wherein the storing of the 3-dimensional map includes:
comparing, by the controller, the position information of the one object sensed by the lidar sensor with the position information of the one object sensed by the depth sensor to obtain a comparison result; and
when an error occurs based on the comparison result, calibrating, by the controller, the position information based on priorities of the lidar sensor and the depth sensor, or calibrating, by the controller, the position information based on a comparison result between a current 3-dimensional map and a previously stored 3-dimensional map in the map storage.

13. The method of claim 12, wherein calibrating, by the controller, the position information includes:
determining, by the controller, one of the lidar sensor and the depth sensor as causing the error based on the comparison result;
calculating, by the controller, a variable for calibrating a sensing result of the determined one of the lidar sensor and the depth sensor; and
applying, by the controller, the variable to the position information of the one object sensed by the determined one of the lidar sensor and the depth sensor to perform the calibration thereof.

14. The method of claim 12, wherein registering, by the controller, object information by prioritizing between a sensing result of the depth sensor when the one object is within a first distance and a sensing result of the lidar sensor when the one object is beyond the first distance.

15. The method of claim 9,
wherein, when a previously stored object in the 3-dimensional map is not sensed within a predefined radius around the robot by the ultrasound sensor, the identifying the moving object includes identify the previously stored object as the moving object.

16. The method of claim 15, further comprising:
identifying, by the ultrasound sensor, another object in a region in which the depth sensor does not sense any object.

17. A method of identifying a moving object in a 3-dimensional space, the method comprising:
calculating a first lidar sensor map reflecting position information of one or more objects sensed by a lidar sensor of a sensor module of a robot;
calculating a depth sensor map reflecting height information and position information of the one or more objects sensed by a depth sensor of the sensor module;

calculating a second lidar sensor map reflecting additional position information of the one or more objects sensed by the lidar sensor;

comparing, by a controller of the robot, the first lidar sensor map and the second lidar sensor map with each other to provide a comparison result;

calculating a position of a removed object from the one or more objects based on the comparison result;

identifying the calculated position in the depth sensor map; and updating, by the controller, the depth sensor map using the height information corresponding to the calculated position of the removed object in the depth sensor map, wherein the sensing module includes an ultrasound sensor configured to sense a distance of the one or more objects within a predetermined radius around the robot, wherein the lidar sensor is configured to calculate a physical distance between the one or more objects and the robot and angle information between the one or more objects and the robot, wherein the depth sensor is configured to calculate depth information of the one or more objects in one direction from the robot, wherein the sensor module is configured to calculate height and position information of the one or more objects using at least two sensors selected from the lidar sensor, the depth sensor, and the ultrasound sensors, wherein the 3-dimensional map is generated by combining a 2-dimensional lidar sensor map generated by the lidar sensor and a 3-dimensional depth sensor map generated by the depth sensor with each other, wherein the controller is further configured to:
store at least one of a first object, a second object, or a third object of the one or more objects in the 3-dimensional map, wherein the first object is commonly sensed by the at least two sensors, wherein the second object is placed at a height at which the second object is not sensed by the lidar sensor, and the second object is sensed by the depth sensor, wherein the third object is not sensed by the depth sensor, and the third object is sensed by the lidar sensor, and when one of the first object, the second object, or the third object stored in the 3-dimensional map is not sensed by the ultrasound sensor:
identify the one of the first object, the second object, or the third object as a moving object, and
remove the moving object from the 3-dimensional map.

18. The method of claim 17, wherein the method further comprises, when the height information of the removed object does not correspond to a height at which the lidar sensor senses the removed object, maintaining, by the controller, the position of the removed object in the depth sensor map.

19. The method of claim 17,
wherein the method further comprises identifying, by the ultrasound sensor, an object in a region outside a field of view of the depth sensor.

\* \* \* \* \*